United States Patent
Machida

(10) Patent No.: US 8,402,477 B2
(45) Date of Patent: *Mar. 19, 2013

(54) NETWORK SYSTEM, INFORMATION PROCESSING APPARATUS, AND INFORMATION PROCESSING METHOD

(75) Inventor: Haruo Machida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 571 days.

This patent is subject to a terminal disclaimer.

(21) Appl. No.: 12/409,429

(22) Filed: Mar. 23, 2009

(65) Prior Publication Data

US 2009/0204979 A1    Aug. 13, 2009

Related U.S. Application Data

(63) Continuation of application No. 10/011,416, filed on Dec. 11, 2001, now Pat. No. 7,536,698.

(30) Foreign Application Priority Data

Dec. 22, 2000  (JP) ................................. 2000-391201
Nov. 20, 2001  (JP) ................................. 2001-355016

(51) Int. Cl.
*G06F 13/00* (2006.01)
*G06F 15/177* (2006.01)
*G06F 9/44* (2006.01)
*G06F 3/00* (2006.01)

(52) U.S. Cl. ........ 719/321; 709/221; 717/121; 717/168; 717/169; 717/170; 717/171; 710/8; 710/10

(58) Field of Classification Search .................. 719/321, 719/327; 710/8; 717/121, 168–171; 709/221
See application file for complete search history.

(56) References Cited

U.S. PATENT DOCUMENTS

| | | | |
|---|---|---|---|
| 5,699,495 A | 12/1997 | Snipp | |
| 5,727,135 A | 3/1998 | Webb et al. | |
| 5,751,967 A | 5/1998 | Raab et al. | |
| 5,784,555 A * | 7/1998 | Stone | 709/220 |
| 5,793,362 A | 8/1998 | Matthews et al. | |
| 5,825,361 A * | 10/1998 | Rubin et al. | 715/839 |
| 5,933,646 A * | 8/1999 | Hendrickson et al. | 717/169 |
| 5,974,473 A * | 10/1999 | Leavitt et al. | 710/8 |
| 6,246,485 B1 | 6/2001 | Brown et al. | |
| 6,336,210 B1 | 1/2002 | Taima et al. | |
| 6,584,503 B1 | 6/2003 | Carney et al. | |
| 6,658,497 B1 | 12/2003 | Kawasaki et al. | |
| 6,714,992 B1 | 3/2004 | Kanojia et al. | |
| 6,718,383 B1 | 4/2004 | Hebert | |
| 6,754,722 B2 | 6/2004 | Herzi | |
| 6,782,422 B1 | 8/2004 | Bahl et al. | |
| 6,789,111 B1 * | 9/2004 | Brockway et al. | 709/222 |
| 6,801,998 B1 | 10/2004 | Hanna et al. | |
| 2002/0083131 A1 | 6/2002 | Machida | |
| 2002/0095526 A1 | 7/2002 | Herzi | |
| 2002/0116482 A1 | 8/2002 | Maeda | |

FOREIGN PATENT DOCUMENTS

JP    9-44437 A     2/1997
JP    10-91565 A    4/1998

(Continued)

*Primary Examiner* — S. Sough
*Assistant Examiner* — Phuong Hoang
(74) *Attorney, Agent, or Firm* — Fitzpatrick, Cella, Harper & Scinto

(57) ABSTRACT

An information processing apparatus can easily delete drivers which become unnecessary as a result of removal of a peripheral device shared on a network or cancellation of a sharing setting. A driver deletion notification including the designation of a driver is input via an external network. In response to the deletion notification, the designated driver is deleted.

8 Claims, 23 Drawing Sheets

FOREIGN PATENT DOCUMENTS

| | | |
|---|---|---|
| JP | 10-289169 | 10/1998 |
| JP | 11-161444 A | 6/1999 |
| JP | 11-203231 A | 7/1999 |
| JP | 2001-167038 A | 6/2001 |

* cited by examiner

FIG.3

| PC NAME | | SNPC00 |
|---|---|---|
| IP ADDRESS | | 100.100.100.1 |
| OS TYPE | | Windows98 |
| USER NAME | | suzuki |
| DRIVER NUMBER | | N |
| 1 | DEVICE TYPE | PRINTER |
| | DRIVER NAME | Printer2000 |
| | VERSION INFO. | 1.00.00 |
| | OUTPUT PORT | LOCAL |
| | SHARING INFO. | ON |
| 2 | DEVICE TYPE | SCANNER |
| | DRIVER NAME | Scanner2000 |
| | VERSION INFO. | 1.00.00 |
| | OUTPUT PORT | LOCAL |
| | SHARING INFO. | ON |
| ⋮ | | |
| N | DEVICE TYPE | PRINTER |
| | DRIVER NAME | Printer2001 |
| | VERSION INFO. | 1.00.00 |
| | OUTPUT PORT | NETWORK |
| | SHARING INFO. | OFF |

FIG.8

| DEVICE TYPE | PRINTER |
|---|---|
| DRIVER NAME | Printer2000 |
| VERSION INFO. | 1.00.00 |
| OUTPUT PORT | ¥¥snpcw2¥Prn2000 |
| SETUP INFO. | 0 |

FIG.9

PRINTER TEST

INSTALLATION OF Printer2000 HAS BEEN COMPLETED.
PC NAME, PRINTER DRIVER, AND PORT SETTING
ARE AS FOLLOWS

DATE: 6/2/2000

PC NAME: SNPC01

DRIVER NAME: Printer2000

VERSION: 1.00.00

OUTPUT PORT: ¥¥SNPCW2¥Prn2000

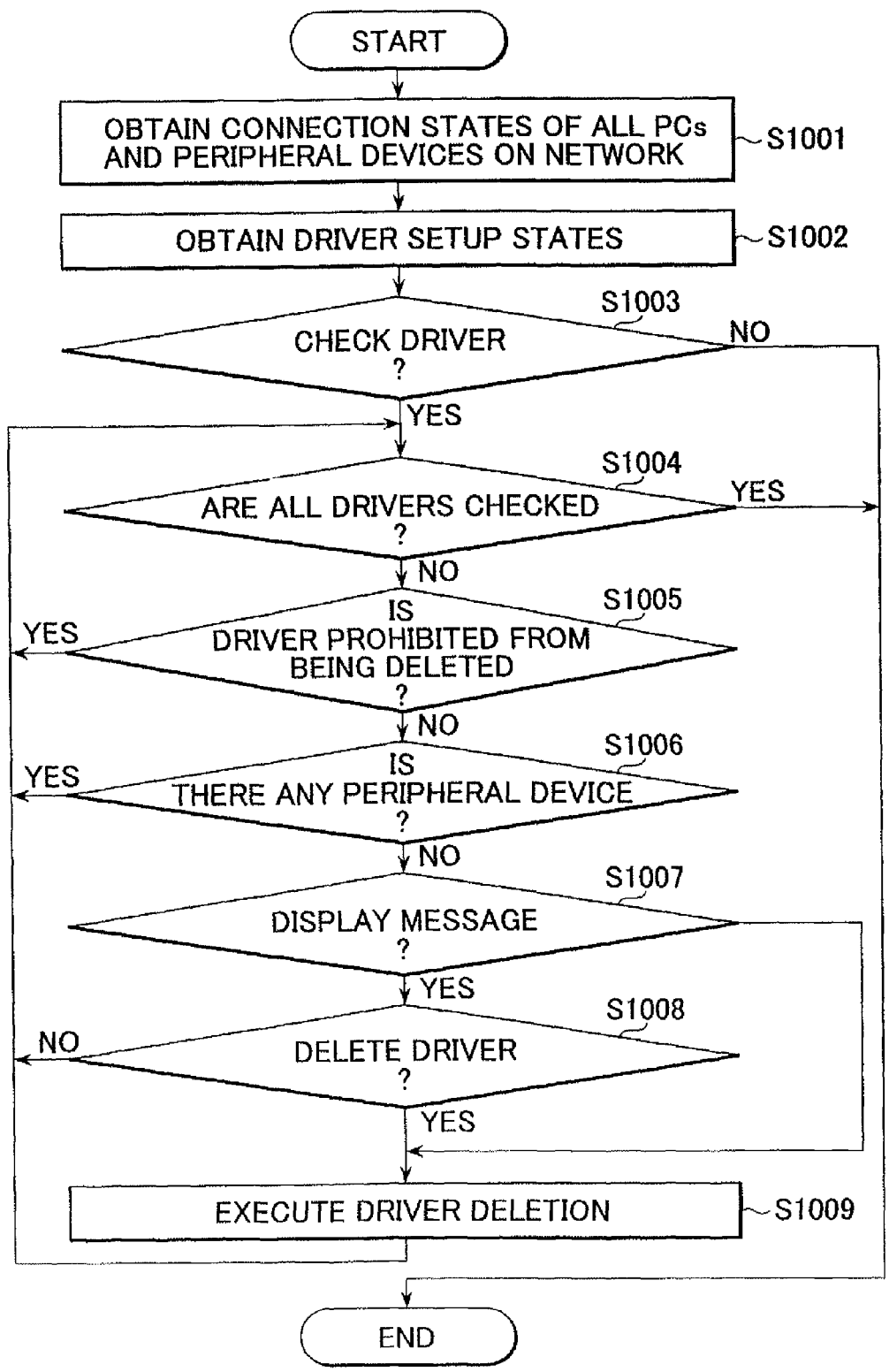

FIG.11

| PC NAME | | SNPC00 |
|---|---|---|
| IP ADDRESS | | 100.100.100.1 |
| OS TYPE | | Windows98 |
| USER NAME | | suzuki |
| DRIVER NUMBER | | B |
| 1 | DEVICE TYPE | PRINTER |
| | DRIVER NAME | LASER-830 |
| | VERSION INFO. | 1.00.00 |
| | OUTPUT PORT | LOCAL |
| | SHARING INFO. | ON |
| 2 | DEVICE TYPE | PRINTER |
| | DRIVER NAME | LASER-2160 |
| | VERSION INFO. | 1.00.00 |
| | OUTPUT PORT | LOCAL |
| | SHARING INFO. | OFF |
| 3 | DEVICE TYPE | PRINTER |
| | DRIVER NAME | Scanner2000 |
| | VERSION INFO. | 1.00.00 |
| | OUTPUT PORT | 100.100.100.123 |
| | SHARING INFO. | OFF |
| 4 | DEVICE TYPE | PRINTER |
| | DRIVER NAME | INKJET-10V |
| | VERSION INFO. | 1.00.00 |
| | OUTPUT PORT | ¥¥NOTEPC01¥INKJET-10V |
| | SHARING INFO. | OFF |
| ⋮ | ⋮ | ⋮ |
| 7 | DEVICE TYPE | SCANNER |
| | DRIVER NAME | Scan 300 |
| | VERSION INFO. | 1.00.00 |
| | OUTPUT PORT | LOCAL |
| | SHARING INFO. | OFF |
| 8 | DEVICE TYPE | SCANNER |
| | DRIVER NAME | Scan FB620 |
| | VERSION INFO. | 1.00.00 |
| | OUTPUT PORT | ¥¥snpc01¥FB620 |
| | SHARING INFO. | OFF |

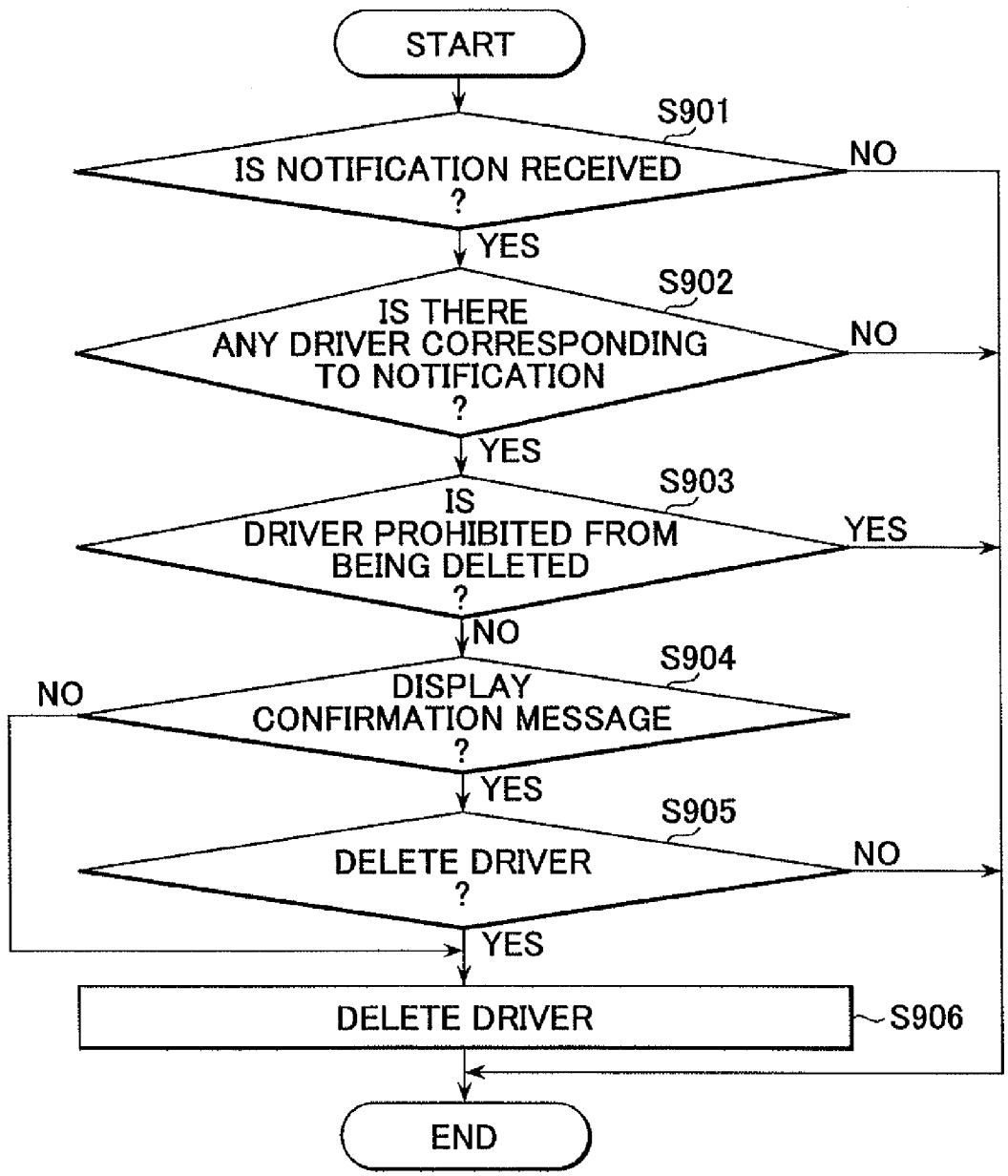

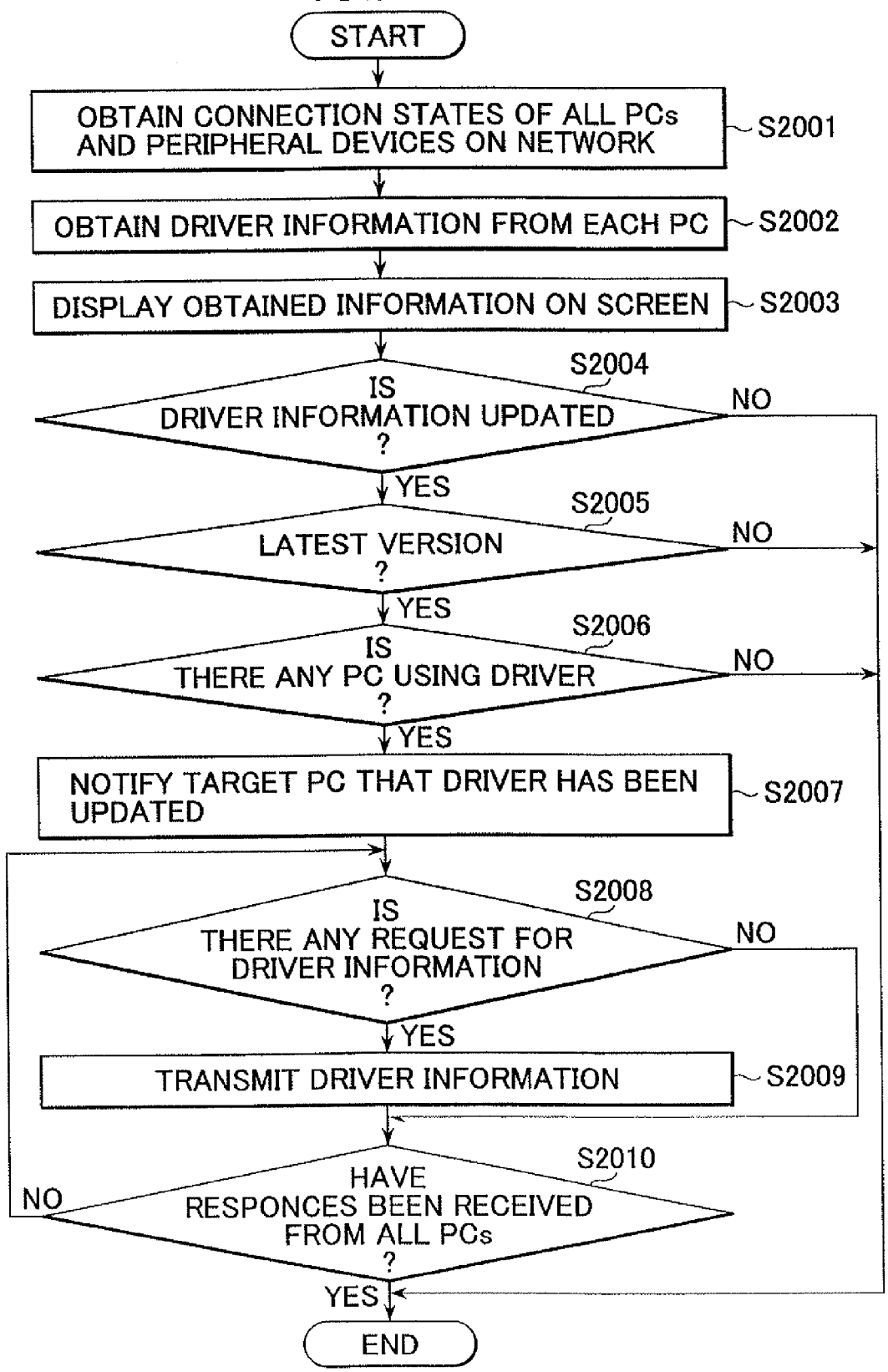

FIG.21

| PC NAME | SNPC00 | |
|---|---|---|
| IP ADDRESS | 100.100.100.1 | |
| OS TYPE | Windows98 | |
| USER NAME | suzuki | |
| DRIVER NUMBER | 8 | |
| 1 | DEVICE TYPE | PRINTER |
| | DRIVER NAME | LASER-830 |
| | VERSION INFO. | 1.00.00 |
| | OUTPUT PORT | LOCAL |
| | SHARING INFO. | LASER-830 |
| | DRIVER INFO.ADDRESS | 0x10000 |
| 2 | DEVICE TYPE | PRINTER |
| | DRIVER NAME | LASER-2160 |
| | VERSION INFO. | 1.00.00 |
| | OUTPUT PORT | LOCAL |
| | SHARING INFO. | 0 |
| | DRIVER INFO.ADDRESS | 0x20000 |
| 3 | DEVICE TYPE | PRINTER |
| | DRIVER NAME | INKJET-10V |
| | VERSION INFO. | 1.00.00 |
| | OUTPUT PORT | ¥¥NOTEPC01¥INKJET-10V |
| | SHARING INFO. | INKJET01 |
| | DRIVER INFO.ADDRESS | 0x30000 |
| ⋮ | ⋮ | ⋮ |
| 8 | DEVICE TYPE | SCANNER |
| | DRIVER NAME | Scan FB620 |
| | VERSION INFO. | 1.00.00 |
| | OUTPUT PORT | ¥¥snpc01¥FB620 |
| | SHARING INFO. | FB620 |
| | DRIVER INFO.ADDRESS | 0x40000 |
| | DRIVER INFORMATION | |

| DEVICE TYPE | PRINTER | |
|---|---|---|
| DRIVER NAME | Canon LBP-830 | |
| VERSION INFO. NUMBER | N | |
| 1 | VERSION INFO. | 1.00.00 |
| | DRIVER INFO. ADDRESS | 0x10000 |
| 2 | VERSION INFO. | 1.20.00 |
| | DRIVER INFO. ADDRESS | 0x20000 |
| | . . . | |
| N | VERSION INFO. | 3.10.00 |
| | DIRVER INFO. ADDRESS | 0x80000 |
| DRIVER INFORMATION | | |

| DEVICE TYPE | PRINTER |
|---|---|
| DRIVER NAME | Printer2000 |
| VERSION INFO. | 1.20.00 |
| OUTPUT PORT | ¥¥snpcw2¥Prn2000 |

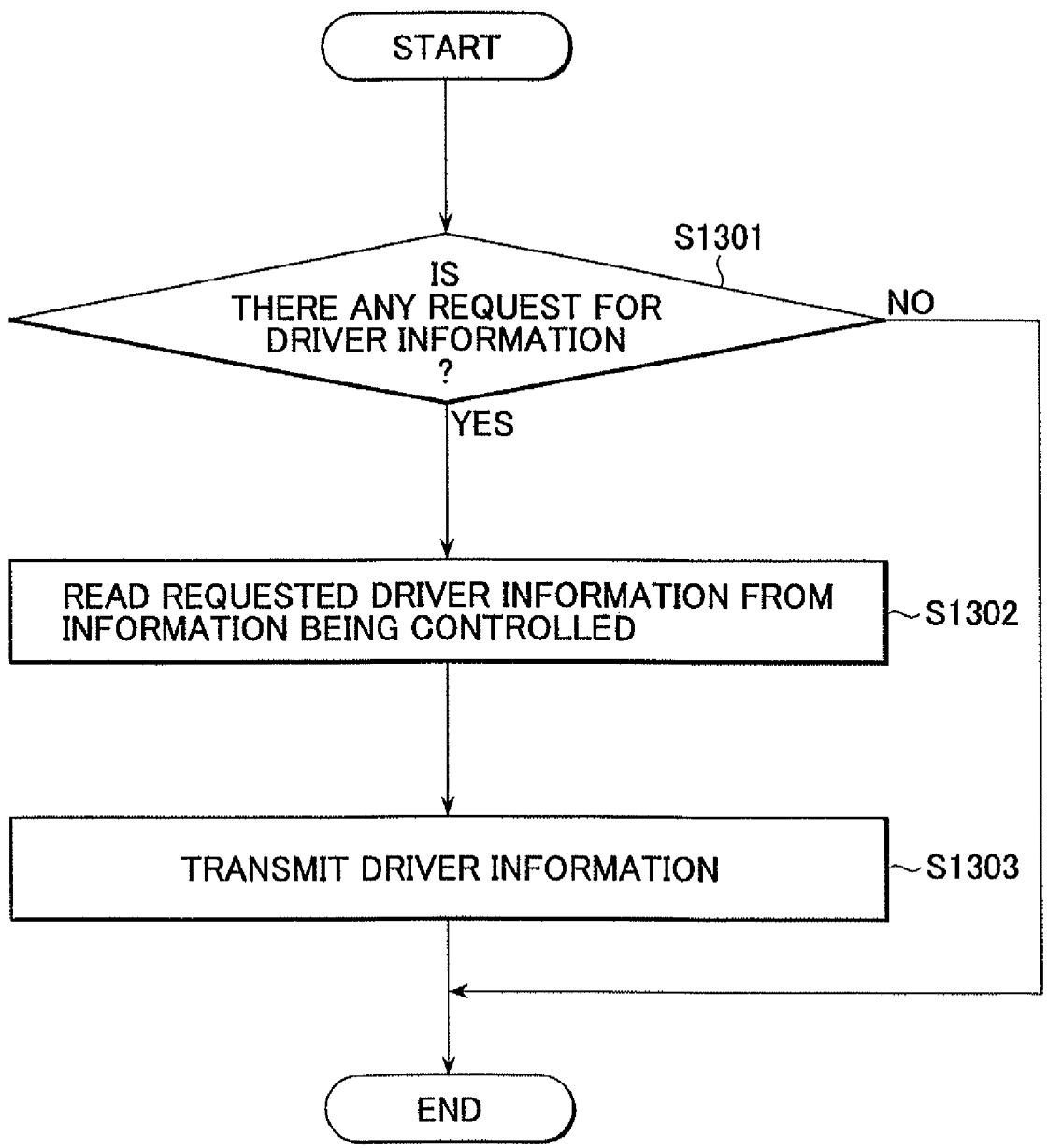

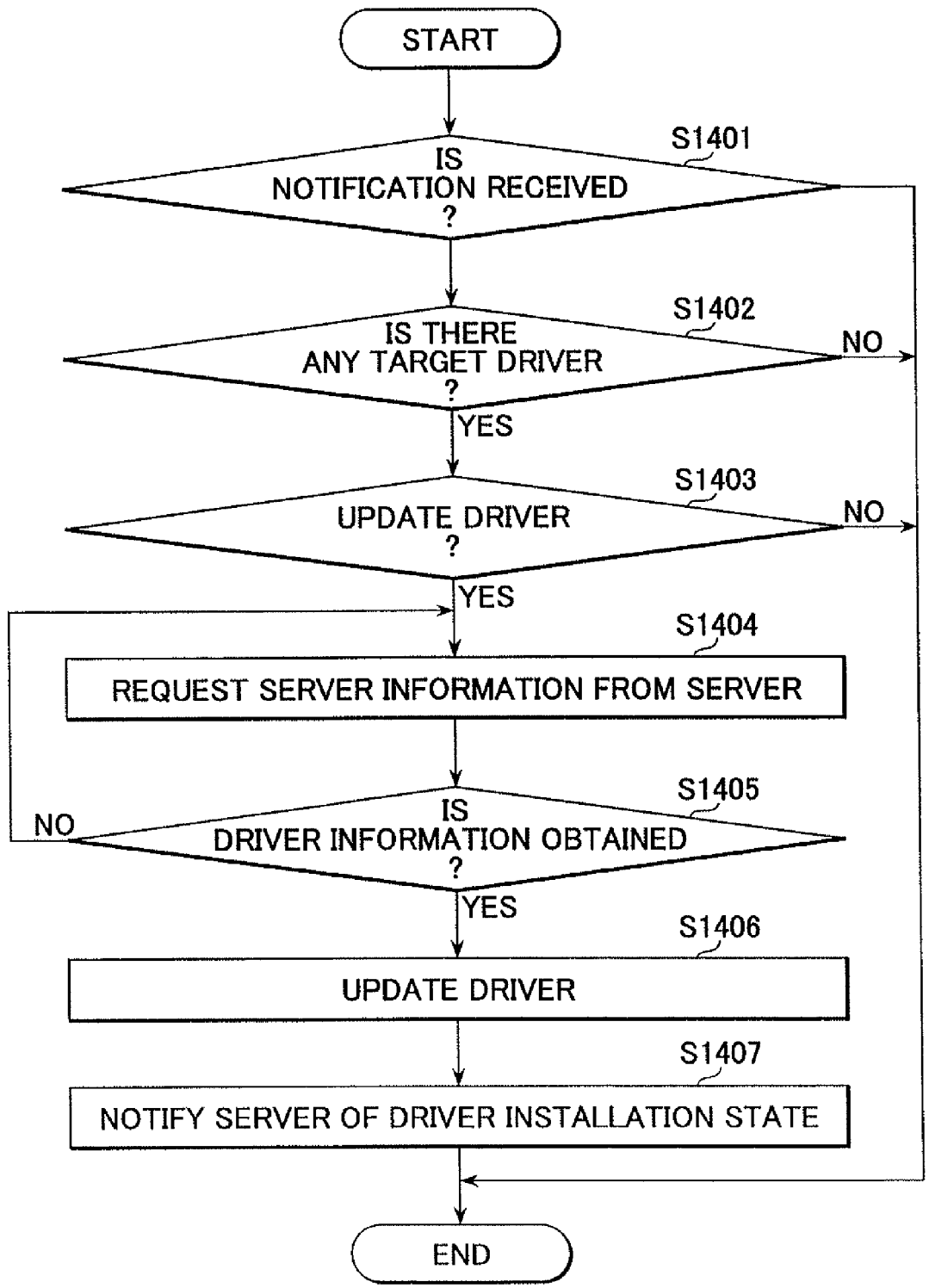

NETWORK SYSTEM, INFORMATION PROCESSING APPARATUS, AND INFORMATION PROCESSING METHOD

This application is a continuation of U.S. application Ser. No. 10/011,416, filed on Dec. 11, 2001, now U.S. Pat. No. 7,536,698, issued on May 19, 2009.

BACKGROUND OF THE INVENTION

1. Field of the Invention

The present invention relates to network systems, information processing apparatuses, and information processing methods for use in displaying and controlling information processing apparatuses and peripheral devices which are shared on a network.

2. Description of the Related Art

Hitherto, personal computers (hereinafter referred to as "PCs") and peripheral devices including printers, scanners, and digital cameras have become widely used. Accordingly, networks including a LAN (local area network) have also become widely used. The need for sharing printers, modems, and scanners by a plurality of PCs over the network has been increasing. A large number of drivers for using these peripheral devices and a large number of installation methods therefor have been provided.

When peripheral devices are replaced by new peripheral devices due to performance problems or when peripheral devices are connected to a different PC, drivers for the peripheral devices often remain undeleted. This makes it difficult to select appropriate drivers when actually using the peripheral devices since unnecessary drivers are also displayed on a list. It may be unclear which drivers are effective. As a result, the operation efficiency is impaired.

SUMMARY OF THE INVENTION

Accordingly, it is an object of the present invention to easily delete drivers which become unnecessary as a result of removal of a peripheral device shared on a network or cancellation of a sharing setting. The object of the present invention is achieved as follows.

In accordance with an aspect of the present invention, an information processing apparatus which is capable of communicating with a peripheral device is provided including a setup information obtaining unit adapted to obtain a setup state of a driver in the information processing apparatus; and a determination unit adapted to determine whether or not the peripheral device corresponding to the driver set up in the information processing apparatus exists.

In accordance with another aspect of the present invention, an information processing apparatus which is capable of communicating with a peripheral device and an external information processing apparatus is provided including a determination unit adapted to determine whether or not the peripheral device corresponding to a set-up driver exists; and a driver deletion notification unit adapted to report a driver deletion notification which causes the external information processing apparatus to delete the driver corresponding to the peripheral device when the determination unit determines that the peripheral device corresponding to the driver does not exist.

In accordance with a further aspect of the present invention, an information processing apparatus for communicating with a peripheral device and a plurality of external information processing apparatuses is provided including a recognition unit adapted to recognize a connection state of a local device connected to the information processing apparatus; and a notification unit adapted to notify the external information processing apparatuses of deletion of a driver corresponding to the local device when the local device is unusable by the external information processing apparatuses due to the connection state of the local device, the connection state being recognized by the recognition unit.

In accordance with yet another aspect of the present invention, an information processing apparatus is provided including an input unit adapted to input a driver deletion notification including the designation of a driver via an external network; and a driver deletion unit adapted to delete the designated driver when the deletion notification is input.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 3 is a table showing an example of a driver information structure.

FIG. 8 is a table showing an example of a driver setup designation structure.

FIG. 9 illustrates an example of driver setup confirmation printing.

FIG. 10 is a flowchart showing a process of checking and deleting a driver.

FIG. 11 is a table showing an example of a driver information structure.

FIG. 18 is a flowchart showing a process when a driver deletion notification is sent.

FIG. 19 is a table showing an example of an information structure which reports driver deletion.

FIG. 20 is a flowchart showing a process of upgrading the version of a driver.

FIG. 21 is a table showing an example of a driver information structure.

FIG. 30 is a flowchart showing a process of upgrading the version of the driver.

FIG. 31 is a flowchart showing a process of upgrading the version of the driver.

DESCRIPTION OF THE PREFERRED EMBODIMENTS

A network system, an information processing apparatus and method, and a computer-readable storage medium according to embodiments of the present invention are described with reference to the accompanying drawings.

Figure 1:
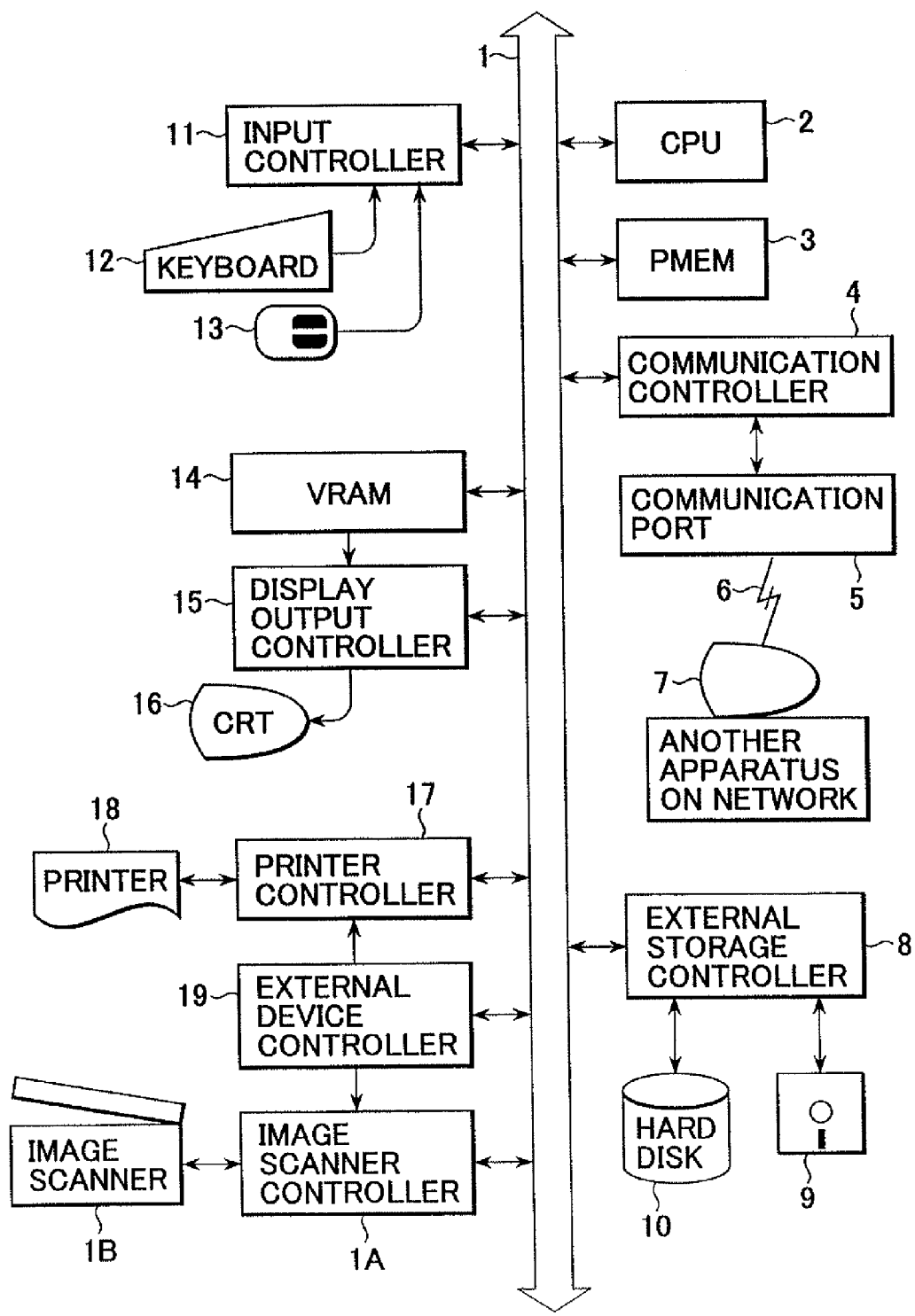
FIG. 1 is a block diagram of an information processing apparatus according to an embodiment of the present invention.

FIG. 1 is a block diagram of an information processing apparatus according to an embodiment of the present invention. In FIG. 1, component blocks (described below) are interconnected by way of a system bus 1.

The information processing apparatus of the embodiment includes a CPU (Central Processing Unit) 2. A program memory (hereinafter referred to as a "PMEM") 3 appropriately selects/reads from a hard disk 10 a program required to perform processing (described below), and the program is executed by the CPU 2. Data input from a keyboard 12 is stored as code information in the PMEM 3 which is also a text memory.

A communication controller 4 controls input/output data at a communication port 5. Signals output from the communication port 5 are transferred through a communication line 6 to a communication port of another apparatus on a network (which in this case is denoted by reference numeral 7). Communication with printers and scanners which are shared on the network is performed through the communication controller 4. In this embodiment, a case in which the network is a LAN (Local Area Network) is used for explanation. Needless to say, the present invention is applicable to a case in which the communication port 5 and the communication line 6 connected to the communication controller 4 are general telephone lines.

An external storage controller 8 is also connected to the system bus 1. Data file disks, which in this case are a floppy disk (FD) 9 and the hard disk (HD) 10, are provided.

Input devices including the keyboard 12 and a mouse 13 are connected to an input controller 11. A user operates the keyboard 12 to give system operation instructions. The mouse 13 functions as a pointing device (PD) which instructs processing of image information on a CRT (Cathode-Ray Tube) 16. A cursor on the CRT 16 is arbitrarily moved in the X and Y directions, whereby a command icon on a command menu is selected to give a processing instruction. Also, the mouse 13 can designate an object to be edited or a position at which an image is to be rendered.

A video image memory (VRAM) 14, a display output controller 15, and the CRT 16 are provided. Data displayed on the CRT 16 is expanded as bit map data on the VRAM 14.

A printer controller 17 controls output of data relative to a printer 18 connected thereto. An image scanner controller 1A controls an image scanner 1B connected thereto.

The program stored in the PMEM 3 in this embodiment can be stored instead in another storage medium such as the hard disk 10 or the floppy disk 9. Alternatively, the program can be stored in another apparatus connected to the network.

Figure 2:
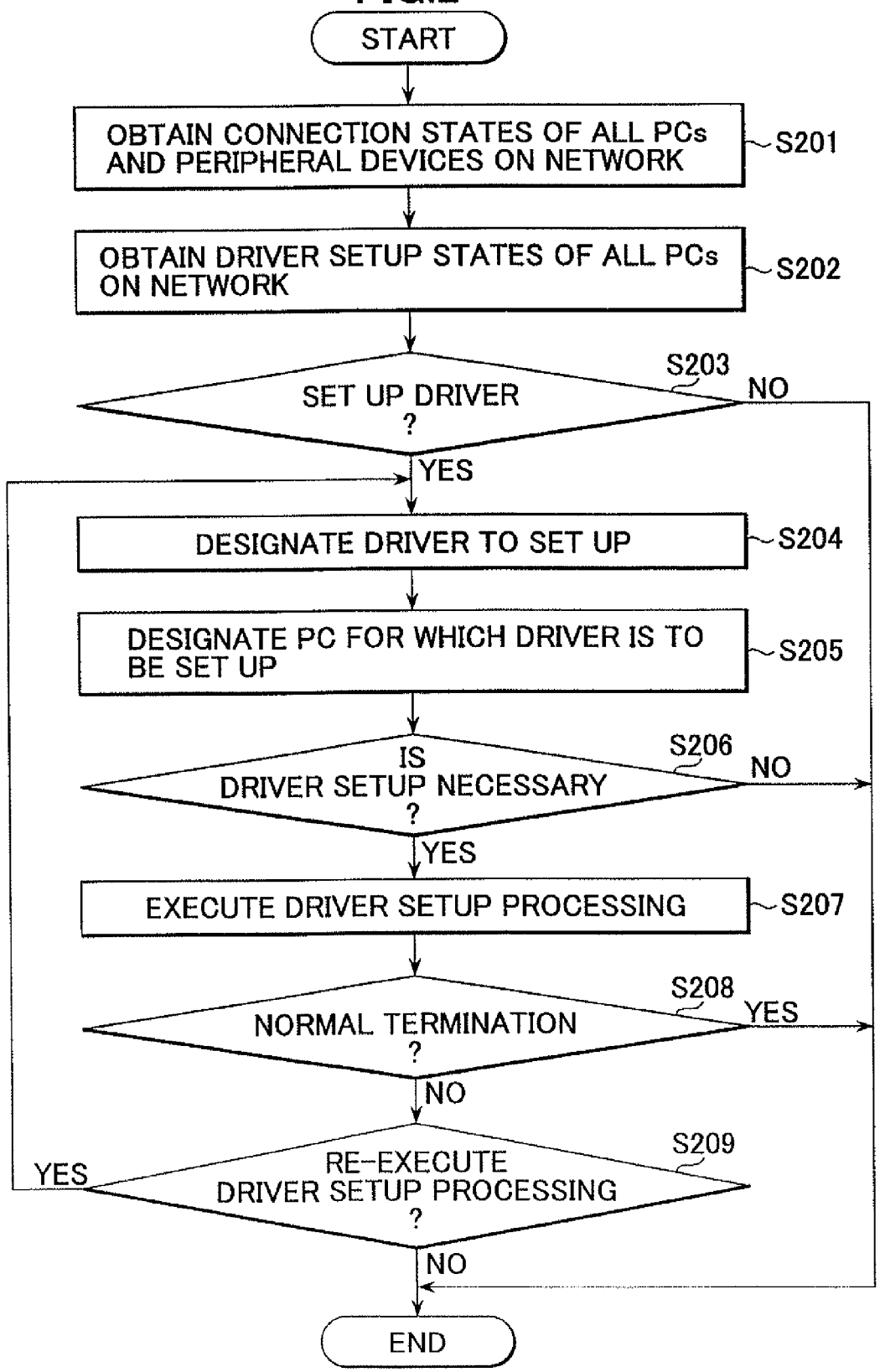
FIG. 2 is a flowchart showing a process of setting up a driver.

Referring to FIGS. 2 to 9, a case in which a peripheral device driver is set up will now be described. FIG. 2 is a flowchart showing a process of setting up a driver. In step S201, the process obtains connection state information for all the PCs and peripheral devices on the network and stores the information.

In step S202, the process obtains setup state information for drivers for peripheral devices of each PC. Peripheral device drivers include drivers for a printer, a scanner, a digital camera, a facsimile machine (fax), etc. For example, the setup information can be obtained by activating, on each PC, a module for obtaining driver information for a driver installed therein, and the information is collected and then communicated over the network.

FIG. 3 illustrates an example of a driver information structure which is set up. The driver information structure includes PC name, IP address, OS type, user name, device driver number, and each piece of device driver information. Each piece of device driver information includes device type such as a printer or scanner, driver name, version information, output port, and sharing information. For example, a printer which is registered at the top has driver information indicating that the driver name is printer 2000, the version is 1.00.00, the output port is local, and sharing information indicates a shared mode (ON).

Figure 4:
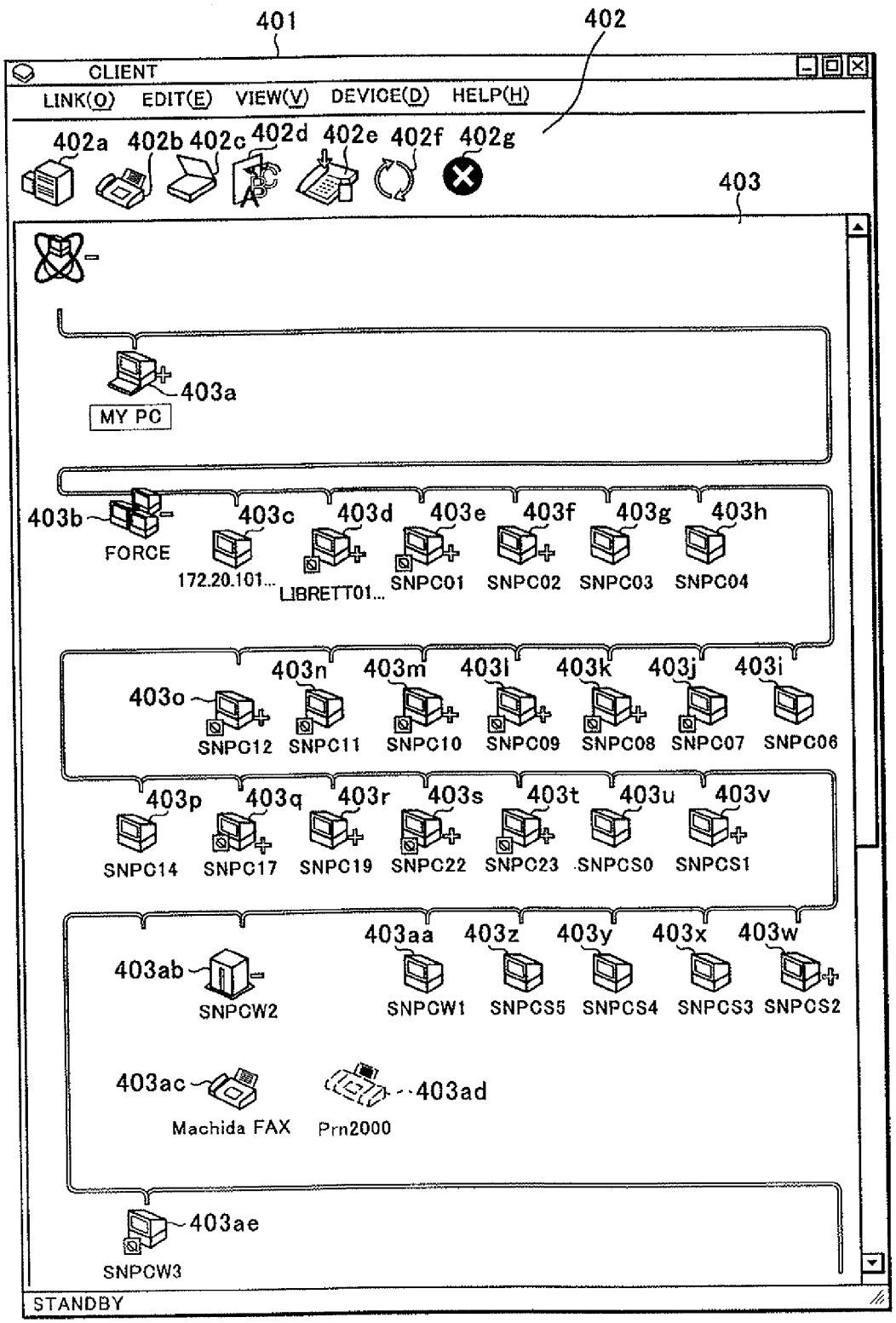
FIG. 4 illustrates an example of a screen displaying PCs and peripheral devices on a network.

FIG. 4 illustrates an example of a screen displaying PCs and peripheral devices on the network. The screen displays a menu 401, a tool bar 402, and a main window 403 displaying icons of the PCs and the peripheral devices on the network.

Icons 402a to 402g represent functions performed by operating the PCs and the peripheral devices using the tool bar 402. For example, the icon 402a is operated to read image data from a selected scanner and to execute a copy function for outputting the image data to a selected printer. The icon 402b represents a fax function. The icon 402c represents an image data scanning function. The icon 402d represents a function of reading image data and performing OCR processing. The icon 402e represents a function of managing fax reception data and distribution data. The icon 402f represents a function of updating information. The icon 402g represents a function of canceling updating.

Icons 403a to 403ae represent the PCs and the peripheral devices which are shared on the network. The icons 403a to 403ae represent device types including PCs, printers, scanners, and fax modems. The icons 403a to 403ae may be changed to indicate the status, such as "now processing", "error occurred", etc. The icon 403a represents a user's PC. The icon 403b represents a domain to which the user's PC is logged on. Since the user's PC is special, the user's PC is displayed to be distinguished from the other PCs.

As the icon 403ad, a PC or peripheral device which is shared on the network although a driver thereof has not yet been installed is indicated by a gray icon. As the icons 403d and 403e, a device which has another device connected thereto although the connected device has not yet been opened is indicated by the "+" symbol. As the icon 403ab, a device which has another device connected thereto and which is opened is indicated by the "−" symbol. As the icons 403c and 403g, when a device has no devices connected thereto, no symbol is added to the icon representing the device.

Accordingly, the connection states and the statuses of all the PCs and peripheral devices on the network can be confirmed on the screen. In this example, due to the limited screen size, not all icons are displayed. However, a scroll bar located at the side of the screen can be used to display all the PCs and peripheral devices.

Figure 5:
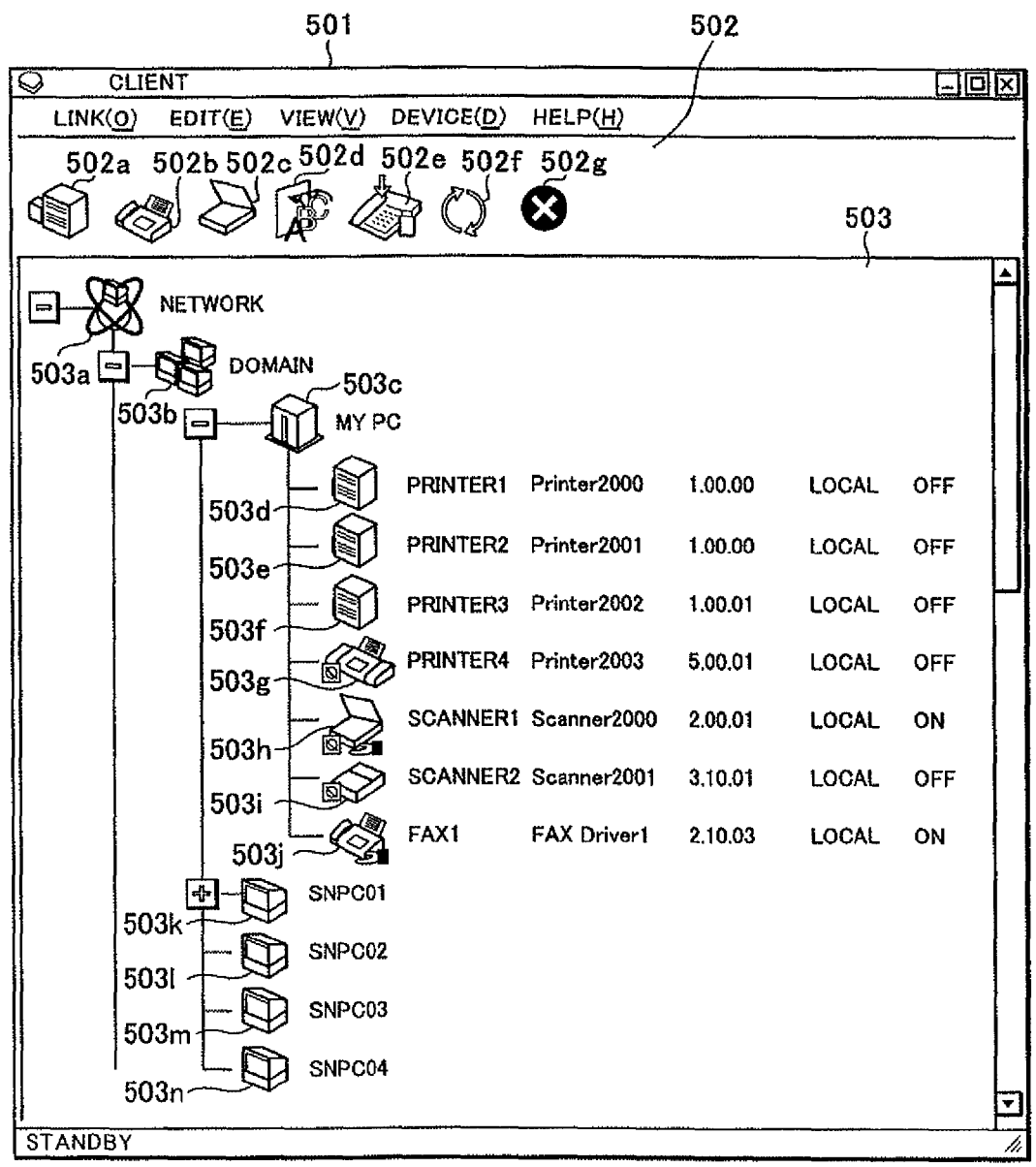
FIG. 5 illustrates an example of a screen displaying driver setup states of PCs on the network.

FIG. 5 shows an example of a screen displaying the driver setup state of each PC on the network. The screen includes a menu 501, a tool bar 502, and a main window 503 which displays icons indicating PCs and peripheral devices on the network.

Icons 502a to 502g indicate functions executed by operating PCs and peripheral devices using the tool bar 502. The contents of the icons 502a to 502g are similar to the icons 402a to 402g shown in FIG. 4. The icons 503a to 502n indicate PCs and peripheral devices shared on the network. Driver information of each peripheral device is displayed, thereby allowing a user to confirm the driver information.

Referring again to FIG. 2, the process determines in step S203 whether to set up a driver for a peripheral device. For example, referring to FIG. 4, the printer 403ad is selected, and a driver setup instruction can be given using a menu. If no driver setup instruction is given, the process is terminated.

Figure 6:
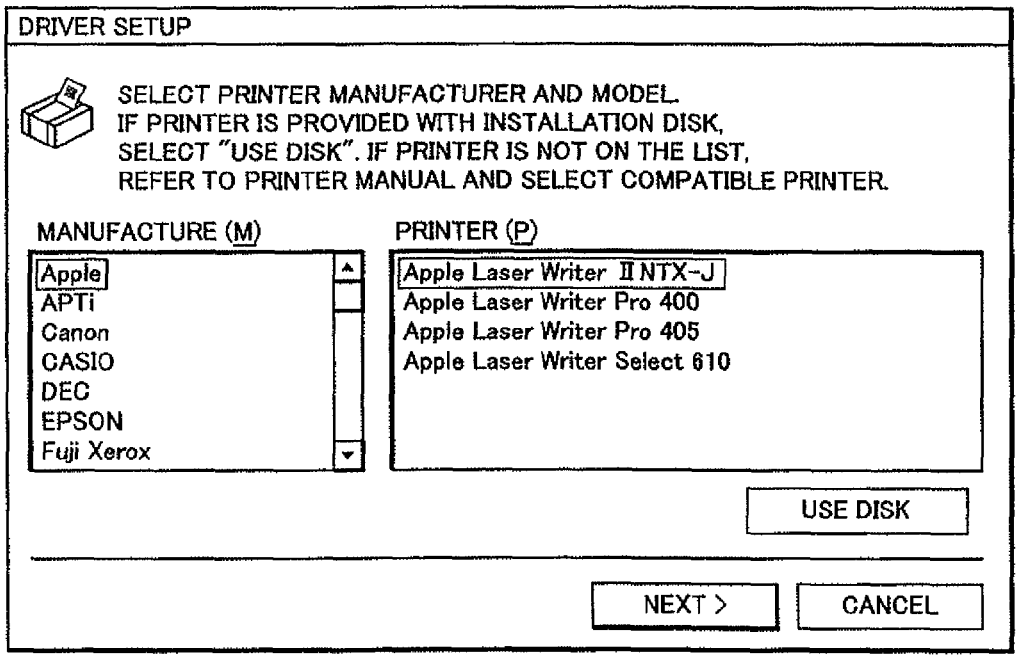
FIG. 6 illustrates an example of a screen for selecting a driver to set up.

If the driver setup instruction is given, the process designates in step S204 a driver to set up. FIG. 6 shows an example of a screen for selecting a driver to set up. A manufacturer is selected, and a target printer is designated. Also, a user can designate a folder containing setup information.

Figure 7:
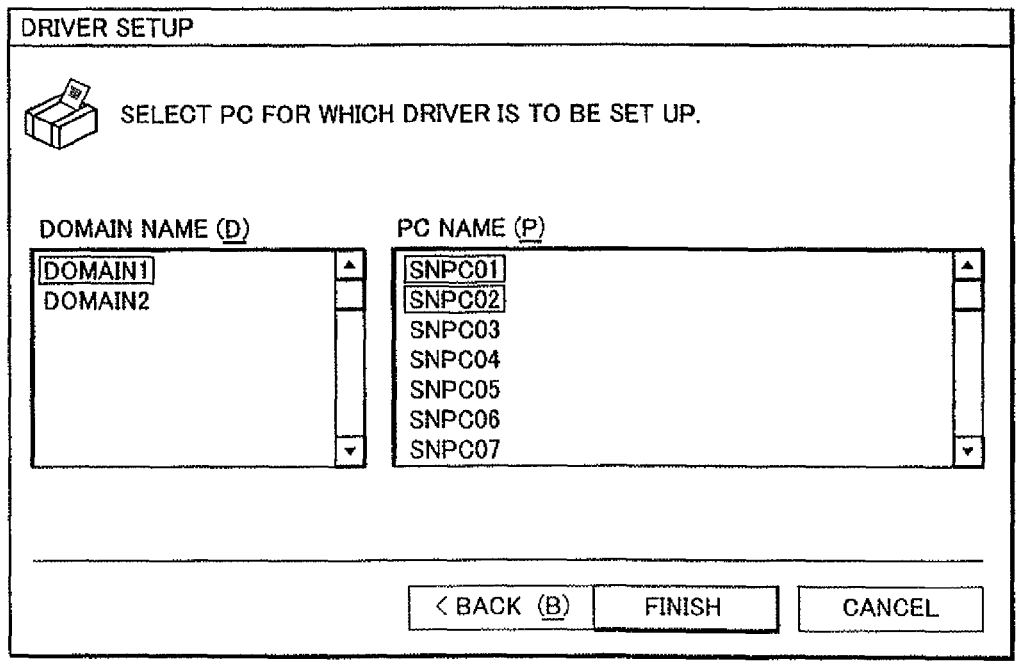
FIG. 7 illustrates an example of a screen for selecting a PC for which the driver is to be set up.

In step S205, the process selects a PC for which the driver is to be set up. FIG. 7 shows an example of a screen for selecting a PC for which the driver is to be set up. A domain and a PC are selected. Instead, a plurality of PCs can be selected.

If the selection is confirmed, the process determines in step S206 whether or not it is necessary to set up the designated driver in the designated PC based on the driver information from the PC. If it is unnecessary to set up the designated driver in the designated PC since, for example, the driver has already been installed in the PC, the driver installation is not performed.

If it is necessary to set up the driver, the process transmits in step S207 an instruction indicating that setting up of the driver designated in step S204 in the designated in step S205 is to be executed. In accordance with the instruction, the driver setup processing is performed. FIG. 8 shows an example of a driver setup instruction structure including the device type, driver name, version information, output port, setup information, and the like. The setup information can be transmitted together with the driver setup instruction structure. Alternatively, the setup information can be stored in a shared folder on the network, and it can be instructed to transmit the path name of the shared folder.

In step S208, the process determines whether or not the driver setup processing is normally terminated. The determination can be performed by determining whether or not the installation of the driver is satisfactorily performed and by determining whether or not the operation using the installed driver is normal. For example, when the driver is normally installed, a message indicating the normal termination is transmitted to the PC which is designated as the PC for which the driver is to be set up, allowing the user to confirm the normal termination on the screen.

In the case of a printer, test printing is also performed. The user can see the print result to confirm whether or not the driver is normally installed. FIG. 9 shows an example of driver setup confirmation printing. By printing the output source PC name, driver name, version information, and the like, the user can confirm for which PC the driver setup has been completed normally. In the case of normal termination, the process is terminated.

In the case of abnormal termination, the process determines in step S209 whether or not to instruct the PC in which the driver setup is not normally terminated to re-execute the driver setup processing. If the driver setup re-execution is instructed, the process returns to step S204. If not, the process is terminated.

As described above, when a peripheral device driver is not installed, a screen displaying PCs and peripheral devices shared on the network enables the user to easily install the peripheral device driver and to determine whether or not the installation is completed. As a result, the operation efficiency on the network can be greatly improved.

With reference to FIGS. 10 to 19, a case in which peripheral device drivers are checked and deleted will now be described. FIG. 10 is a flowchart showing a process of checking and deleting a driver. In step S1001, the process obtains connection state information for all the PCs and the peripheral devices on the network and store the information.

In step S1002, the process obtains setup state information for peripheral device drivers installed in an user's PC. The peripheral device drivers include drivers for printers, scanners, digital cameras, faxes, and the like.

FIG. 11 shows an example of a driver information structure which is set up. The driver information structure includes a PC name, IP address, OS type, user name, device driver number, and each piece of device driver information. Each piece of device driver information includes device type such as a printer or scanner, driver name, version information, output port, and sharing information. For example, a printer which is registered at the top has driver information indicating that the driver name is LASER-830, the version is 1.00.00, the output port is local, and sharing information indicates a shared mode (ON).

Figure 12:
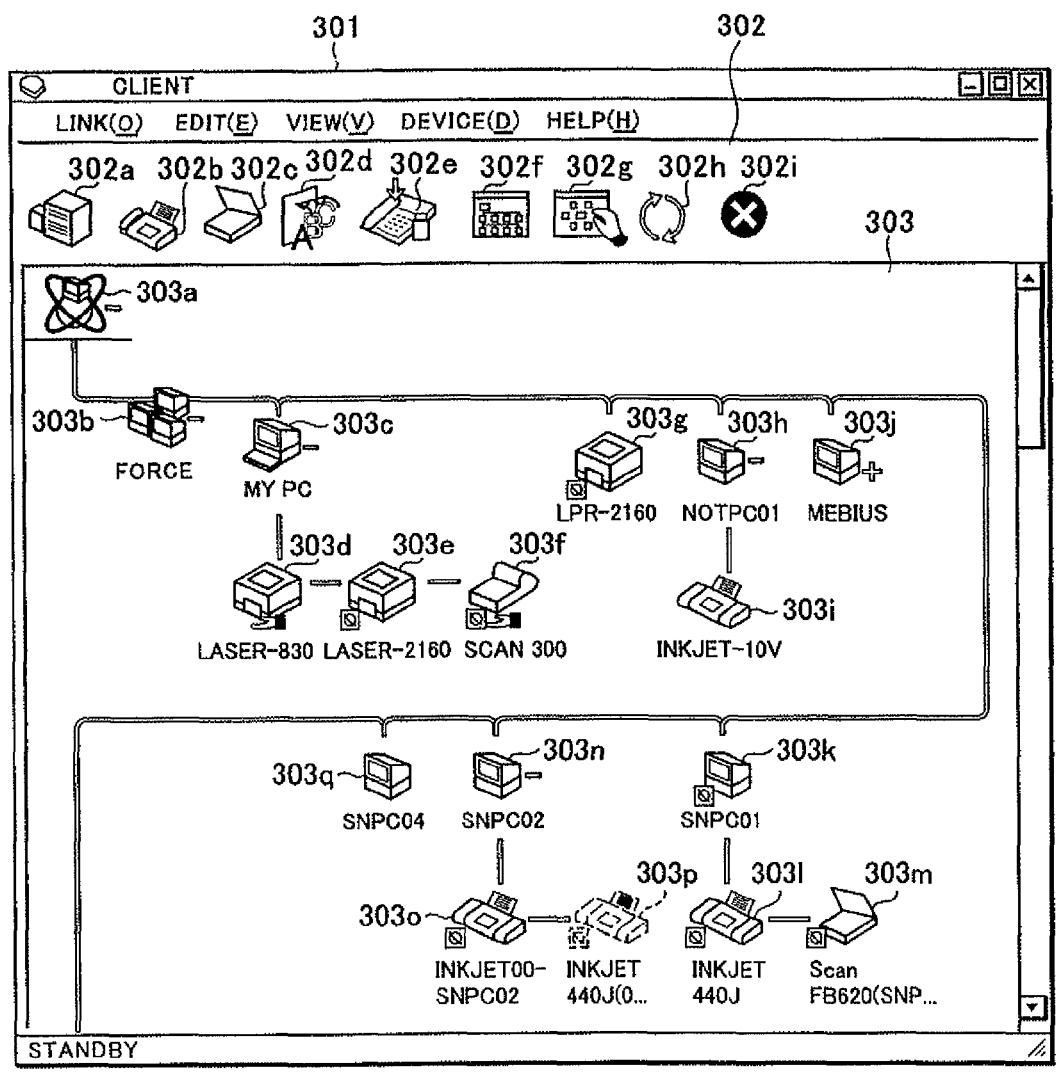
FIG. 12 illustrates an example of a screen displaying PCs and peripheral devices on the network.

FIG. 12 illustrates an example of a screen displaying PCs and peripheral devices on the network. The screen displays a menu 301, a tool bar 302, and a main window 303 displaying icons of the PCs and the peripheral devices on the network.

Icons 302a to 302i represent functions performed by operating the PCs and the peripheral devices using the tool bar 302. For example, the icon 302a is operated to read image data from a selected scanner and to execute a copy function for outputting the image data to a selected printer. The icon 302b represents a fax function. The icon 302c represents an image data scanning function. The icon 302d represents a function of reading image data and performing OCR processing. The icon 302e represents a function of managing fax reception data and distribution data. The icon 302f represents a function of switching the display. The icon 302g represents a function of editing the display screen. The icon 302h represents a function of updating information. The icon 302i represents a function of canceling updating.

Icons 303a to 303q represent the PCs and the peripheral devices which are shared on the network. The icons 303a to 303q represent device types including PCs, printers, scanners, and fax modem. The icons 303a to 303q may be changed to indicate the status, such as "now processing", "error occurred", etc. The icon 303c represents a user's PC. The icon 303b represents a domain to which the user's PC is logged on. Since the user's PC is special, the user's PC is displayed at the top to be distinguished from the other PCs. The other PCs are represented alphabetically in ascending or descending order.

As the icon 303p, a PC or peripheral device which is shared on the network although a driver thereof has not yet been installed is indicated by a gray icon. As the icon 303j, a device which has another device connected thereto although the connected device has not yet been opened is indicated by the "+" symbol. As the icons 303*h*, 303*k*, and 303*n*, a device which has another device connected thereto and which is opened is indicated by the "−" symbol. As the icon 303*q*, when a device has no devices connected thereto, no symbol is added to the icon representing the device.

Accordingly, the connection states and the statuses of all the PCs and peripheral devices on the network can be confirmed on the screen. In this example, due to the limited screen size, not all icons are displayed. However, a scroll bar located at the side of the screen can be used to display all the PCs and peripheral devices.

Figure 13:
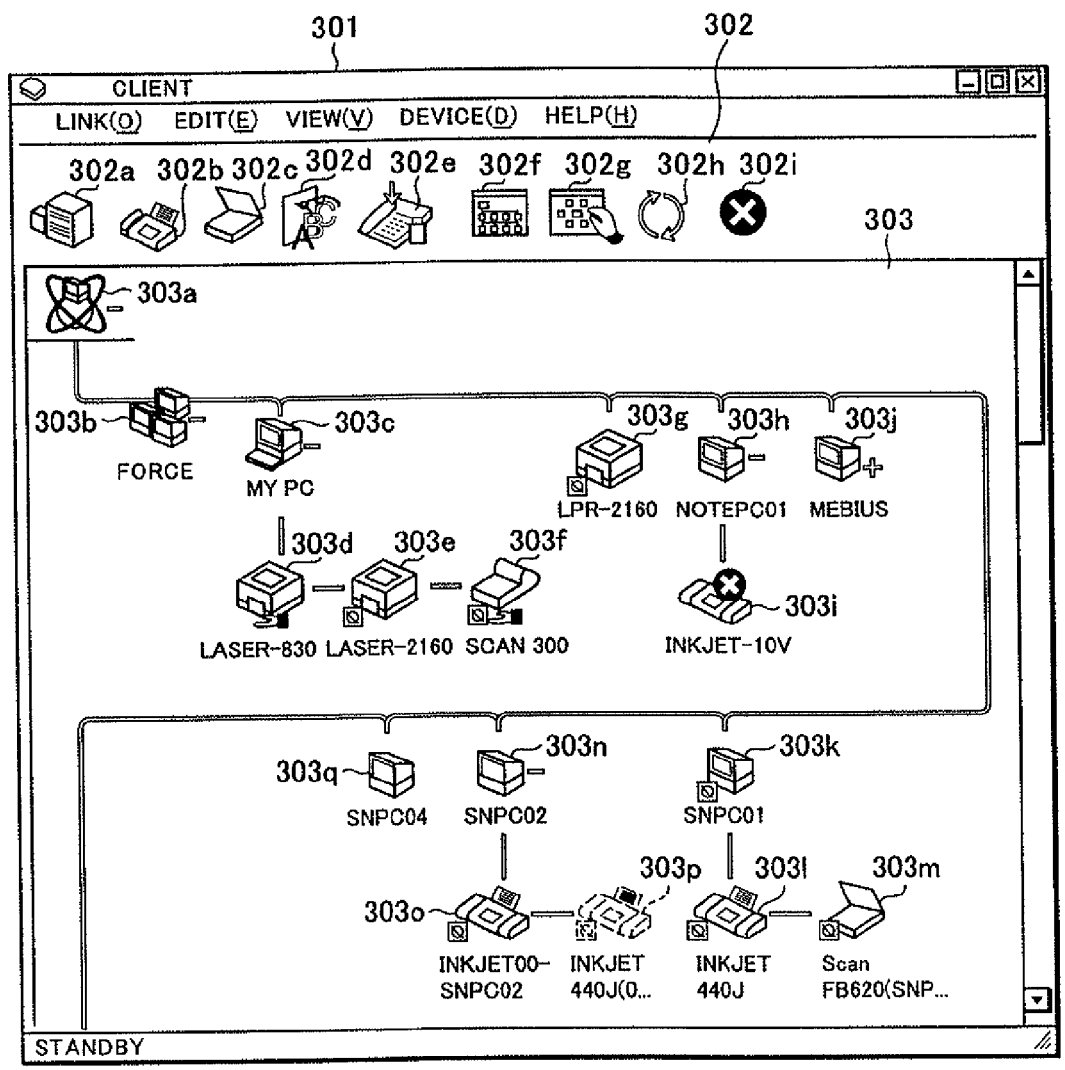
FIG. 13 illustrates an example of a screen which is displayed when a sharing setting of a printer represented by an icon 303i is cancelled or when a driver is deleted.

FIG. 13 shows an example of a screen displayed when a shared mode of a printer represented by the icon 303*i* connected to a PC represented by the icon 303*h* is canceled or when a driver is deleted. As shown in FIG. 13, the icon 303*i* is indicated by the symbol "X" representing an "unusable state". In this state, although the driver is installed, the actual output destination has not yet been set. Therefore, the printer cannot output data.

Figure 14:
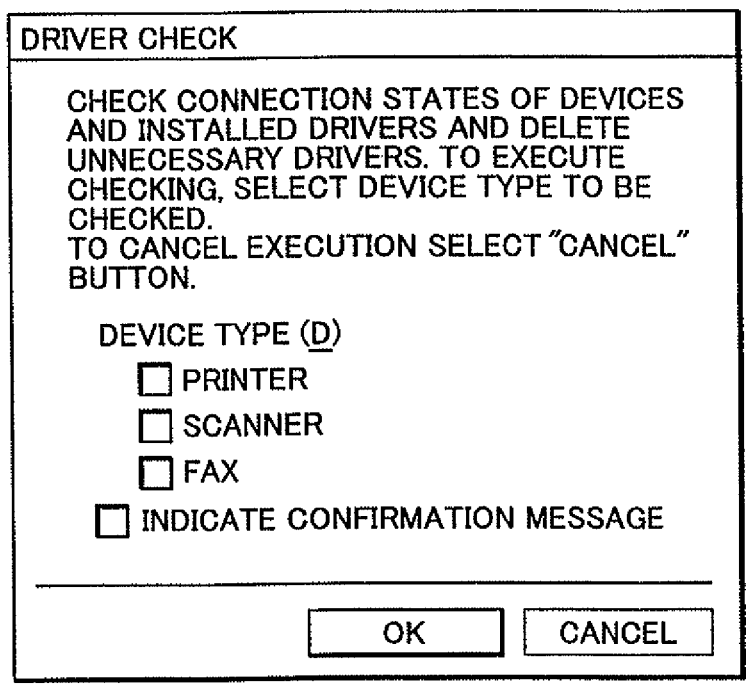
FIG. 14 illustrates an example of a screen for selecting a device to check.

Referring again to FIG. 10, the process determines in step S1003 whether or not to check the peripheral device drivers. For example, a screen displayed in FIG. 14 is displayed. By selecting the device type to be checked, a driver checking instruction can be given. When it is determined on the screen that it is unnecessary to check a particular driver due to the lack of the corresponding device, it is also possible to set whether to display a message. When no driver checking instruction is given, the process is terminated.

When the driver checking instruction is given, the process determines in step S1004 whether all the drivers which are supposed to be checked have been checked. When all the drivers are checked, the process is terminated.

When not all drivers are checked, the process determines in step S1005 whether the drivers to be checked are prohibited from being deleted. For example, when a driver for a frequently-used printer which happens to be turned OFF is checked, it is determined that there is no corresponding device, and therefore the driver is deleted. In this case, it becomes necessary to reinstall the driver. This is inconvenient for the user.

Figure 15:
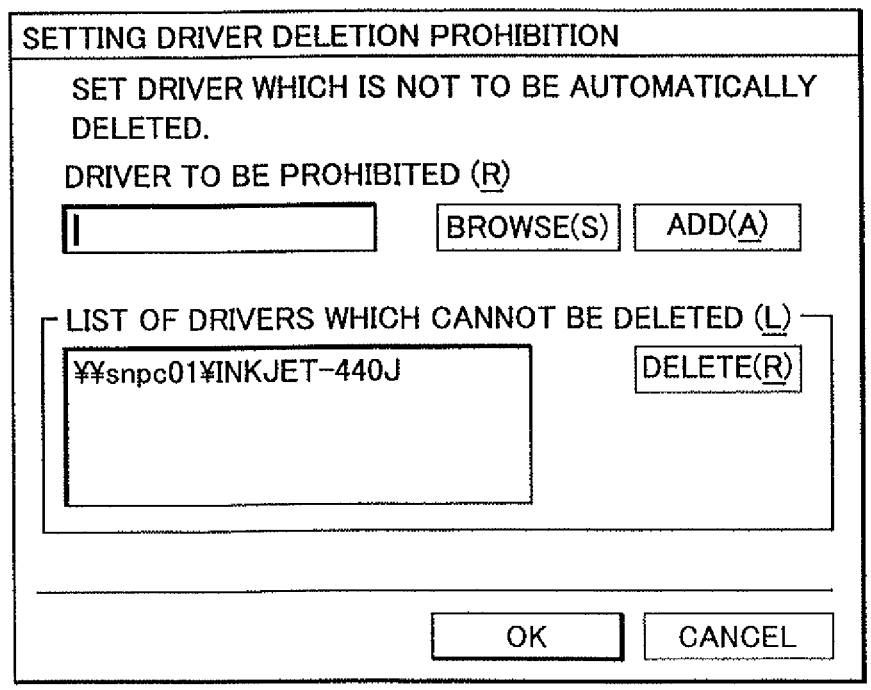
FIG. 15 illustrates an example of a screen for performing a driver deletion prohibiting setting.

A driver the user does not want to delete can be prohibited from being deleted. FIG. 15 shows an example of a screen for prohibiting a driver from being deleted. A driver to be prohibited from being deleted is selected and added to a prohibition list, and the driver is thereby prohibited from being deleted. Conversely, a driver for which the user wants to cancel prohibition can be deleted from the prohibition list.

If it is determined in step S1005 that the driver cannot be deleted, the process returns to step S1004 and checks the next driver. If it is determined in step S1005 that the driver is not prohibited from being deleted, the process determines in step S1006 whether there is a device corresponding to the driver. For example, for a printer, the process queries the output port and determines whether a response is received. For a scanner, the process performs similar processing relative to the input port. If the corresponding device exists, the process returns to step S1004 and checks the next driver.

If there is no device corresponding to the driver, the process determines in step S1007 whether to display a deletion message. The determination is performed in accordance with the information set in step S1003. If the message is set to be displayed, the process proceeds to step S1008. If no message is set to be displayed, the process proceeds to step S1009.

Figure 16:
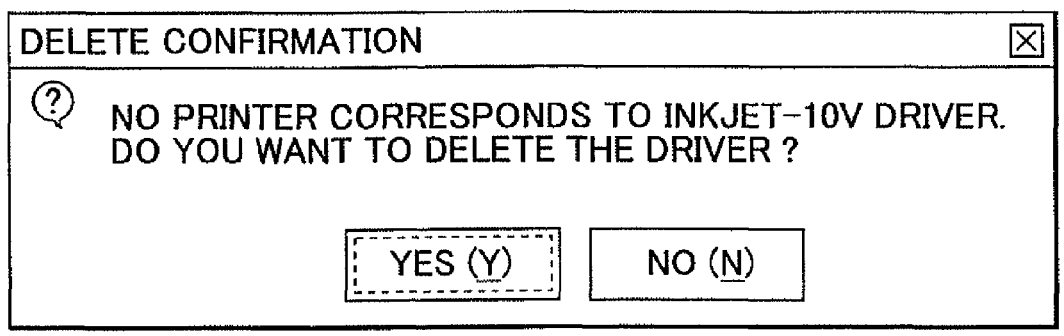
FIG. 16 illustrates an example of a message displayed when there is a driver to delete.

In step S1008, the message prompting the user to give an instruction indicating whether to delete the driver is displayed. FIG. 16 shows an example of a message displayed when there is a driver to delete. As shown in FIG. 16, a driver to delete is indicated, and the user gives an instruction indicating whether to delete the driver. If "yes" is selected, the process proceeds to step S1009. If "no" is selected, the process returns to step S1004 and checks the next driver.

In step S1009, the process executes deletion of the designated driver. After deleting the driver, the process returns to step S1004 and checks the next driver.

Figure 17:
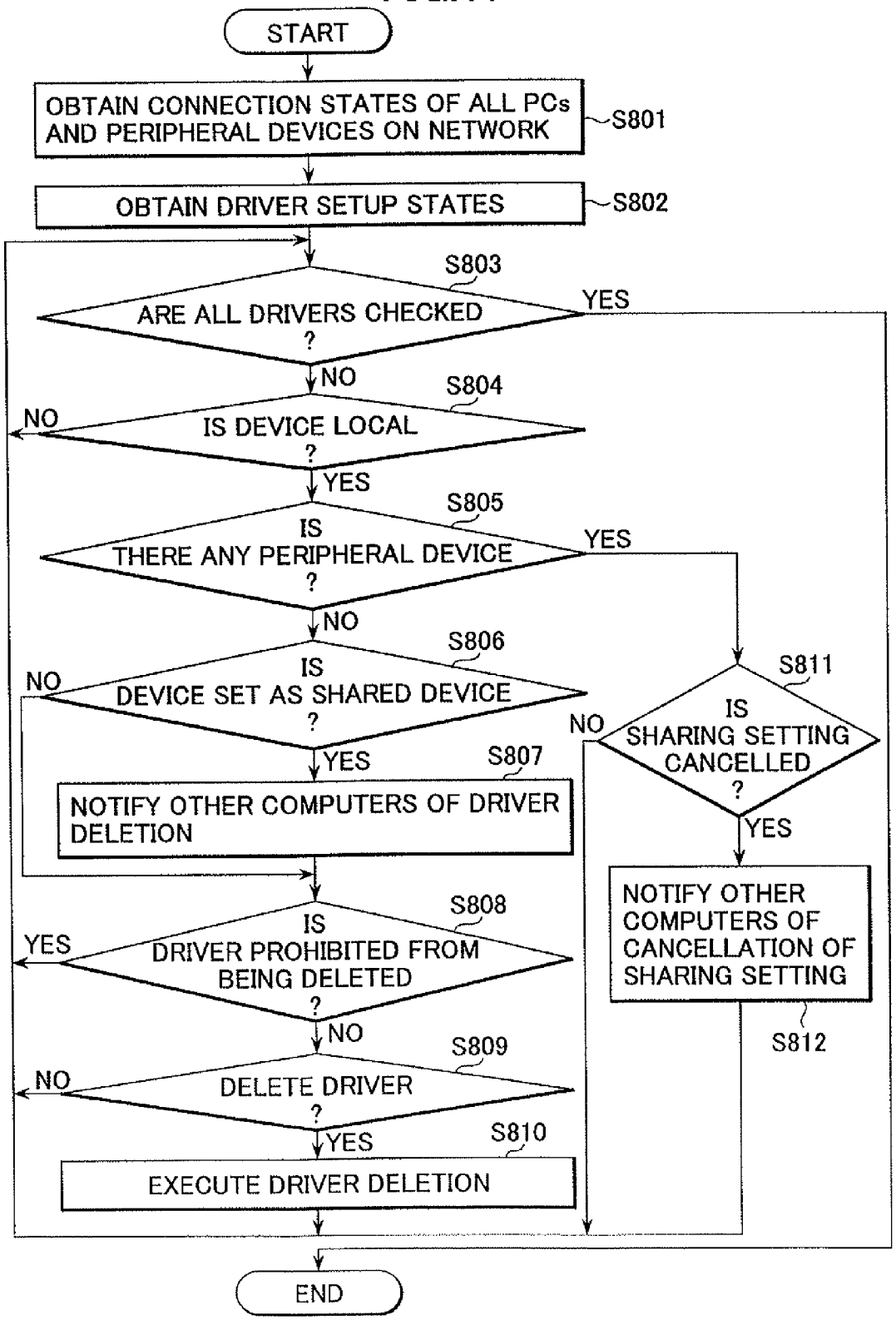
FIG. 17 is a flowchart showing a process of checking and deleting a driver.

The flowchart shown in FIG. 10 shows a case in which a driver is checked by a computer for which a device is set to be in a shared mode. Alternatively, an instruction to delete a driver may be given by a computer which sets a shared mode of a device. FIGS. 17 and 18 are flowcharts of processes for giving, by a computer (which is the information processing apparatus of the present invention) which sets a shared mode for a device, an instruction to delete a driver.

In steps S801 and S802, the process performs processing similar to that in steps S1001 and S1002. In step S803, the process determines whether all the installed drivers have been checked. If all the drivers have been checked, the process is terminated.

When not all drivers are checked, the process determines in step S804 whether a device corresponding to the driver is a local device or a device shared on the network. If the device is not local, the process returns to step S803 and checks the next driver.

If the device is local, the process determines in step S805 whether there is a device corresponding to the driver. The determination is performed in a manner similar to that in step S1005. If there is a device corresponding to the driver, the process proceeds to step S811.

If there is no device corresponding to the driver, the process determines in step S806 whether the driver has set a shared mode. If the driver has not set a shared mode, the process proceeds to step S808.

If the driver has set a shared mode, in step S807 the process notifies, through the network, the other computers of the fact that the corresponding device has become unusable. The process then proceeds to step S808. FIG. 19 shows an example of an information structure indicating deletion of the driver. The information structure includes the device type, driver name, version information, and output port.

In the above processing, a computer (information processing apparatus of the present invention) which sets a shared mode of the device obtains setup state information for peripheral device drivers for each PC (external information processing apparatus). The peripheral device drivers include drivers for printers, scanners, digital cameras, faxes, and the like. For example, the setup information can be obtained by activating, on each PC, a module for obtaining driver information for a driver installed therein, and the information is thus requested and collected. The information processing apparatus of the present invention can communicate the information from the external information processing apparatus (each PC) over the network.

The driver deletion notification unit in information processing apparatus (the PC which sets a shared mode of devices) sends notification of deletion of the drivers in an external information processing apparatus. Receiving this notification of deletion of the drivers from the information processing apparatus, driver deletion unit in the external information processing apparatus deletes the drivers in the external information processing apparatus. Users can given an instruction which cause to send notification(s) to delete the drivers by a dialog of the information processing apparatus before sending the notification of deleting drivers to external information processing apparatus.

FIG. 21 illustrates an example of a driver information structure which is set up. The driver information structure includes PC name, IP address, OS type, user name, device driver number, and each piece of device driver information. Each piece of device driver information includes device type such as a printer or scanner, driver name, version information, output port, and sharing information. For example, a printer which is registered at the top has driver information indicating that the driver name is LASER-830, the version is 1.00.00, the output port is local, the sharing name is LASER-830, and the driver information address is 0x1000. The information is recorded for each PC.

By transmitting/receiving the setup information among the PCs as described above, each PC can recognize the device driver in a shared mode. Using the information, a PC (information processing apparatus of the present invention) setting a shared mode of a local device which has become unusable by other computers notifies PCs having the driver for the local device in a shared mode of the fact that the local device has become unusable. When the PCs receive the notification including the designation of a driver corresponding to the unusable device, as shown in FIG. 18, the PCs delete the driver corresponding to the unusable device.

In this embodiment, a PC for which a driver for a target local device has been set up is detected, and a driver deleting instruction is given to that PC by canceling a shared mode. However, the present invention is not limited to this embodiment. An instruction to delete a driver can be given to all the PCs on the network, whereby the PCs each delete the driver when the driver is set therefor.

In step S808, the process determines whether the target driver is prohibited from being deleted. The determination can be performed in a manner similar to that in step S1005. If the driver is prohibited from being deleted, the process returns to step S803 and checks the next driver.

If the driver is not prohibited from being deleted, the process determines in step S809 whether to delete the driver. The determination is performed in a manner similar to that in step S1008. If deletion of the driver is canceled, the process returns to step S803 and checks the next driver.

If it is instructed to delete the driver, the process deletes the driver in step S810. After deleting the driver, the process returns to step S803 and checks the next driver.

In step S811, the process determines whether the target driver has canceled the shared mode. If the target driver has not canceled the shared mode, the process returns to step S803 and checks the next driver.

If the target driver has canceled the shared mode, in step S812, the process notifies, through the network, the other computers of the fact that the target device has become unusable.

As shown in FIG. 18, each computer to be notified of the driver deletion determines in step S901 whether a notification of driver deletion is received. If no notification is received, the process is terminated.

If the notification is received, the process determines in step S902 whether there is a driver corresponding to the driver deletion notification. If there is no corresponding driver, the process is terminated.

If the corresponding driver exists, the process determines in step S903 whether the target driver is prohibited from being deleted. The determination is performed in a manner similar to that in step S1005. If the driver is prohibited from being deleted, the process is terminated.

If the driver is not prohibited from being deleted, the process determines in step S904 whether to display a message. If it is set not to display the message, the process proceeds to step S906. If it is set to display the message, the process proceeds to step S905 and displays the message.

If no deletion instruction is given in step S905, the process is terminated. If it is instructed to delete the driver, the process deletes the target driver in step S906, and the process is terminated.

As described above, on the screen displaying the PCs and the peripheral devices shared on the network, when a peripheral device shared on the network becomes unusable due to the fact that it has been removed or its sharing setting has been canceled, a corresponding driver which has become unnecessary can be uninstalled by simple operations. When a driver for a shared peripheral device is deleted or sharing setting is canceled, the unnecessary driver can be deleted by notifying the other computers. With these functions, the operation efficiency on the network can be greatly improved.

Referring to FIGS. 20 to 31, a case in which the version of a peripheral device driver is upgraded will now be described. FIG. 20 is a flowchart showing a process of upgrading the version of a driver. In step S2001, the process obtains connection state information for all the PCs and the peripheral devices on the network and stores the information.

In step S2002, the process obtains setup state information for peripheral device drivers for each PC. The peripheral device drivers include drivers for printers, scanners, digital cameras, faxes, and the like. For example, the setup information can be obtained by activating, on each PC, a module for obtaining driver information for a driver installed therein, and the information can be collected and communicated over the network.

FIG. 21 illustrates an example of a driver information structure which is set up. The driver information structure includes PC name, IP address, OS type, user name, device driver number, and each piece of device driver information. Each piece of device driver information includes device type such as a printer or scanner, driver name, version information, output port, sharing name, and driver information address. For example, a printer which is registered at the top has driver information indicating that the driver name is LASER-830, the version is 1.00.00, the output port is local, the sharing name is LASER-830, and the driver information address is 0x1000. The information is recorded for each PC.

In step S2003, the process displays the connection state information for all the PCs and the peripheral devices on the network based on the obtained information. Since the screen has already been described with reference to FIG. 12, a detailed description thereof is omitted.

Figure 22:
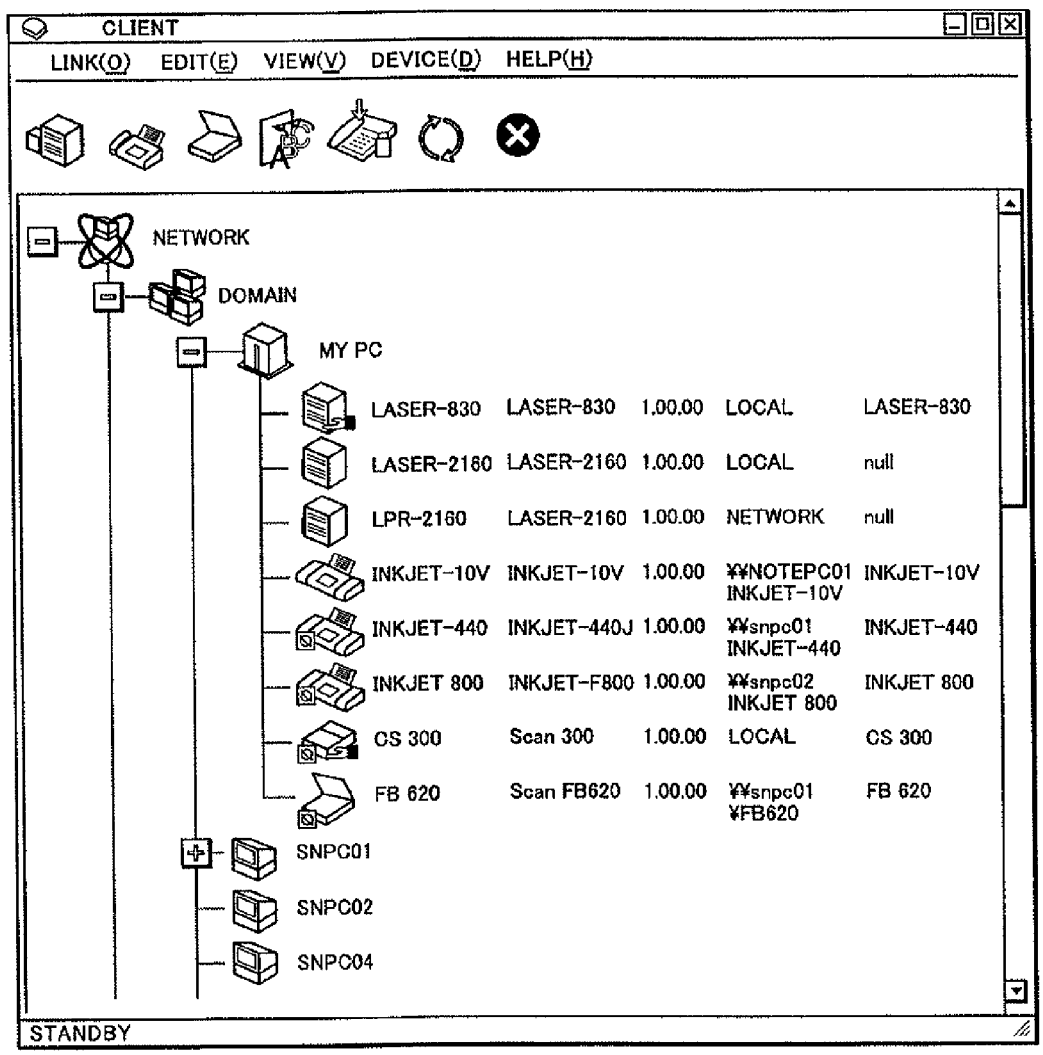
FIG. 22 illustrates an example of a screen displaying driver setup states of PCs on the network.

FIG. 22 shows an example of a screen displaying driver setup states for each PC on the network based on a driver information structure obtained from each PC. For example, as shown in FIG. 22, drivers installed in the user's PC include drivers for six printers and drivers for two scanners. Among these drivers, for example, a driver for the printer "INKJET-10V" has the driver name "INKJET-10V", the version number "1.00.00", and the output port name "\\NOTPC01\INKJET-10V". The printer driver named "INKJET-10V" is shared on the network.

Figure 23:
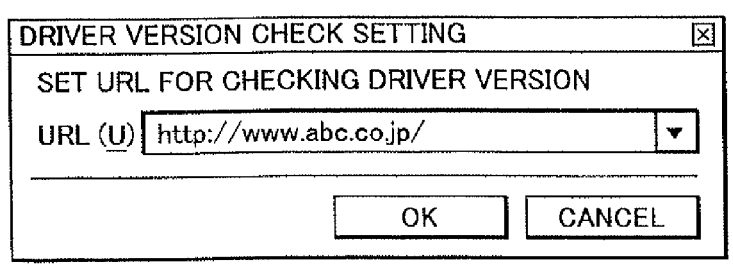
FIG. 23 illustrates an example of a screen for performing a driver version check setting.

Referring again to FIG. 20, the process determines in step S2004 whether the peripheral device driver has been updated. If the driver has not been updated, the process is terminated. If the driver has been updated, the process proceeds to step S2005. The driver can be updated by updating, at each PC, the driver and registering the driver information in a PC which functions as a server. Alternatively, the user can download the latest driver from a manufacturer's site and register the driver. Alternatively, a specific location on the network can be designated, and the version of the driver can be checked at the location. FIG. 23 shows an example of a screen for performing driver version check setting. As shown in FIG. 23, a specific URL (Universal Resource Locator) can be set, and the version of the driver can be periodically checked. When the driver has been updated, the latest driver can be automatically obtained.

Figures 24, 25:
FIG. 24 is a table showing an example of a structure whose version is controlled according to each driver.
FIG. 25 illustrates an example of a screen for selecting a target PC for which the driver is to be updated.

In step S2005, the process determines whether the updated driver is the latest version. If the driver is not the latest version, it is unnecessary to report the driver update, and hence the process is terminated. If the driver is the latest version, the process proceeds to step S2006. The version of the driver can be detected based on printer driver information managed by the server. FIG. 24 shows an example of a structure whose version is controlled for each driver. The structure includes the device type such as a printer or scanner, device driver name, version information number being managed, driver version information, and corresponding driver information. The version can be detected by comparing the version information being managed with the version information for the updated driver.

In step S2006, the process determines whether there are PCs using the updated driver. The determination is performed by using a device driver information structure obtained from each PC. If there is no PC using the driver, the process is terminated. If there are PCs (target PCs) using the driver, a list of target PCs is displayed. FIG. 25 shows an example of a screen for selecting the target PCs for which the driver is to be updated. When a target PC(s) is selected and "OK" is selected, the process proceeds to step S2007 and notifies the selected PC(s). If "select all target PCs" is selected, all the target PCs are selected.

Figures 26, 27:
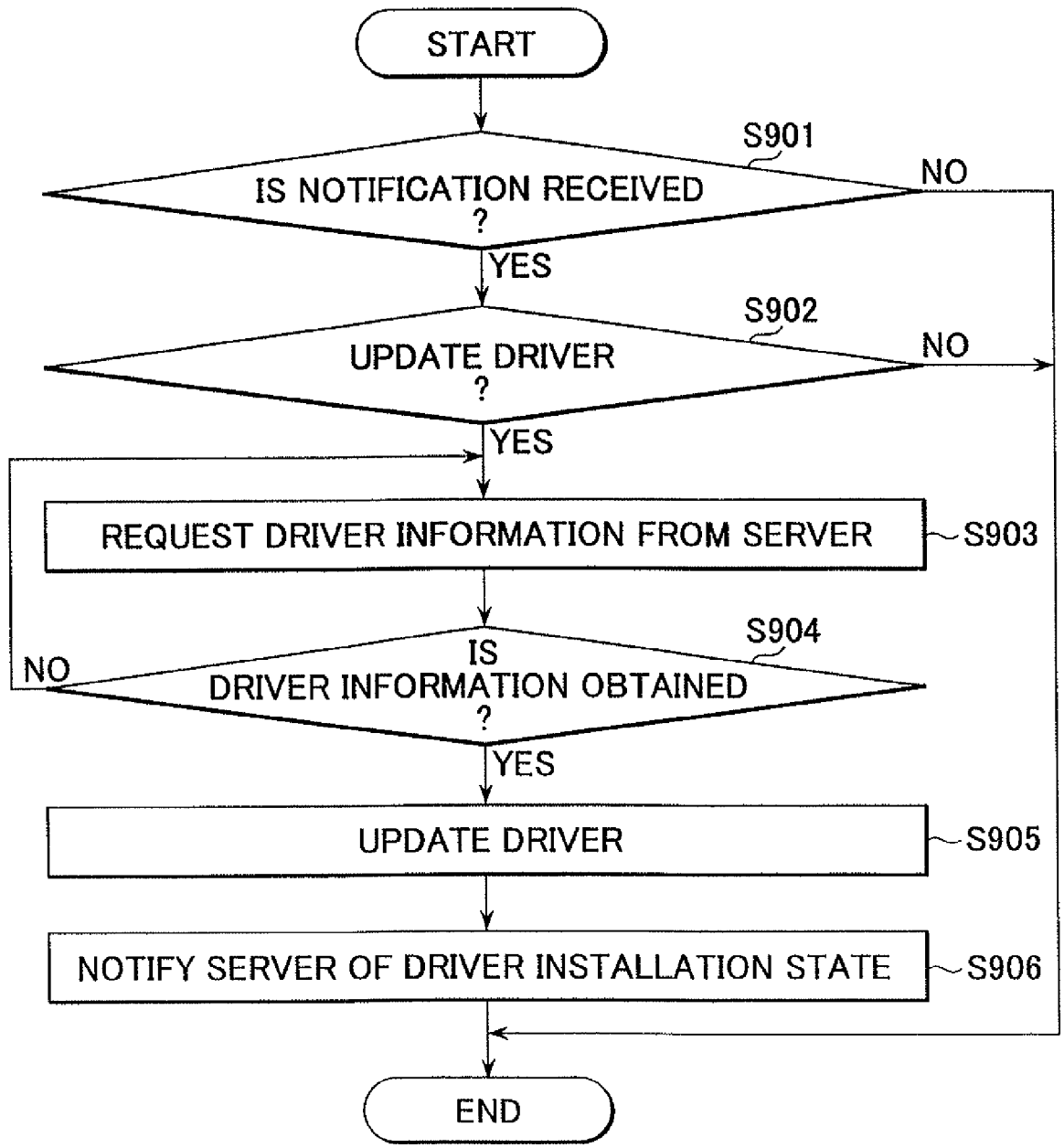
FIG. 26 is a table showing an example of an information structure for reporting the driver update.
FIG. 27 is a flowchart showing a process of upgrading the version of a driver.

In step S2007, the process notifies the selected target PC(s) of the fact that the driver has been updated. FIG. 26 shows an example of an information structure for reporting the driver update. The information structure includes the device type, driver name, version information, and output port.

In step S2008, the process determines whether a request for driver information is made by the notified PC(s). If no request is made or if a response indicating that it is unnecessary to transmit driver information is received from a client PC, the process proceeds to step S2010. If a request for driver information is made, the process proceeds to step S2009 and transmits the requested driver information to the client PC.

In step S2010, the process determines whether responses have been received from all the notified PCs. If responses have been received from all the PCs, the process is terminated. If responses have not yet been received from all the PCs, the process returns to step S2008.

FIG. 27 is a flowchart showing a process performed by a client. In step S901, the client determines whether the client has been notified by the server of the driver update. If the client has not been notified, the process is terminated.

Figure 28:
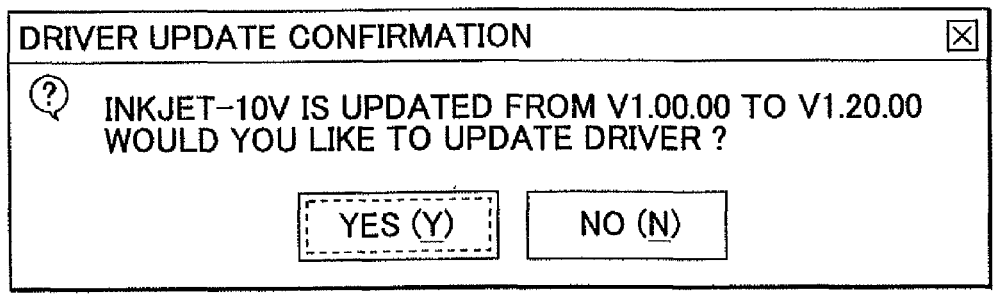
FIG. 28 illustrates an example of a screen displaying a message indicating that the driver has been updated.

If the client has been notified, the process proceeds to step S902 and determines whether to update the driver. For example, a message indicating that the driver has been updated is displayed, and the user can indicate whether or not to update the driver. FIG. 28 shows an example of a message indicating that the driver has been updated. If "no" is selected, the process informs the server of the fact that the target driver information is unnecessary, and the process is terminated. If "yes" is selected, the process proceeds to step S903 and requests the server to transmit the target driver information.

In step S904, the process determines whether the driver information has been obtained. If the driver information has not been obtained, the process returns to step S903 and again requests the server to transmit the driver information. If the driver information has been obtained, the process proceeds to step S905 and updates the driver. In step S906, the process informs the server of the latest driver installation state, and the process is terminated.

Figure 29:
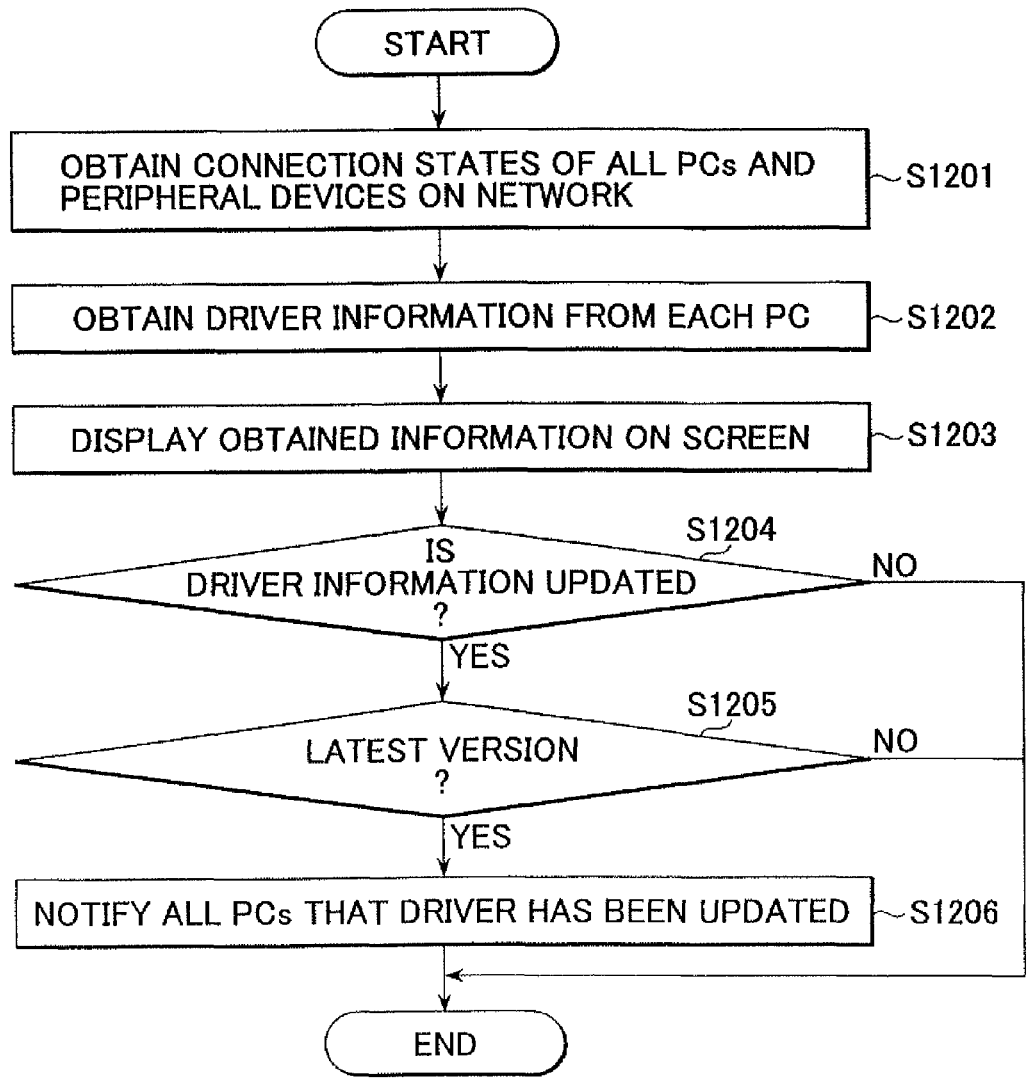
FIG. 29 is a flowchart showing a process of upgrading the version of a driver.

In the flowcharts shown in FIGS. 20 and 27, when a driver is updated, PCs to be notified of the driver update are selected by a PC functioning as a server. Alternatively, a PC functioning as a client can determine whether to update a driver installed therein based on the driver state and update the driver if necessary. FIGS. 29 to 31 are flowcharts showing a process performed by a PC functioning as a client to determine whether to update a driver installed therein based on the driver state and to update the driver.

Referring to FIG. 29, steps S1201 to S1205 are the same as steps S2001 to S2005. In step S1206, all the PCs are notified of the fact that the driver has been updated, and the process is terminated. An information structure to be reported is the same as one shown in FIG. 26.

Referring now to FIG. 30, a process of processing a request from a client is shown. In step S1301, the process determines whether there is any request for driver information. If there is no request, the process is terminated.

If the request is made, in step S1302, the process reads the requested driver information from driver information being managed. In step S1303, the process transmits the driver information to the client who has sent the request.

On the other hand, the client performs a process in accordance with the flowchart shown in FIG. 31. The flowchart is approximately similar to that shown in FIG. 27. Steps S1401 and S1403 to S1407 are as illustrated in steps S901 to S906 in FIG. 27. However, determination in step S1402 is performed in a different manner.

In step S1402, when the client is notified of the driver update by the server, the client reads necessary data from the driver update notification structure and compares the read data with the driver information installed therein, thereby determining whether there is a target driver that has been reported as being updated. If there is no target driver, the notification is ignored, and the process is terminated. If the target driver is detected, the process performs processing similar to that shown in FIG. 27.

As described above, on the screen displaying the PCs and the peripheral devices shared on the network, when a peripheral device driver is updated, the driver can be updated by simple operations. By notifying each PC of the driver update information, each PC can determine whether to update the driver. Therefore, the network traffic can be reduced to a minimum. With these functions, the operation efficiency on the network can be greatly improved.

Other Embodiments

In order to operate various devices so as to achieve the functions of the foregoing embodiment, software program code for achieving the functions of the foregoing embodiment is supplied to a computer in an apparatus or system connected to the various devices, whereby the various devices are operated in accordance with the program stored in the computer (CPU (Central Processing Unit) or MPU (Microprocessing Unit)) in the system or the apparatus. This is also included within the scope of the present invention.

In this case, the software program code achieves the functions of the foregoing embodiment, and hence the program code and means such as a recording medium having stored therein the program code for supplying the program code to the computer form the present invention. Recording media for storing the program code include, for example, a floppy disk, a hard disk, an optical disk, a magneto-optical disk, a CD-ROM, a CD-R, a magnetic tape, a non-volatile memory card, and a ROM.

When the computer execute the supplied program code, the functions of the foregoing embodiment can be achieved. Also, the program code in combination with an OS (Operating System) running on the computer or other application software can achieve the functions of the foregoing embodiment. These cases are also included within the scope of the present invention.

The supplied program code is stored in a memory provided in an add-on board inserted into the computer or an add-on unit connected to the computer, and subsequently, based on instructions of the program code, a CPU or the like provided in the add-on board or the add-on unit performs part of or the entirety of the actual processing, thereby achieving the functions of the foregoing embodiment. This is also included within the scope of the present invention.

It is to be understood that the form and structure of each part illustrated in the embodiments are to be taken as an illustrative example rather than limitation and that changes and modifications may be made without departing from the scope and spirit of the present invention.

As described above, according to the present invention, drivers which become unnecessary as a result of removal of a peripheral device shared on a network or cancellation of a sharing setting can be uninstalled by simple operations. Also, unnecessary drivers can be deleted by notifying other computers of the fact that a driver for a shared peripheral device has been deleted or that the sharing setting has been cancelled. With these functions, the operation efficiency on the network can be greatly improved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus which communicates with an image forming apparatus and an external information processing apparatus via a network and stores a device driver for controlling the image forming apparatus, the information processing apparatus comprising:
   at least a processor, functioning as:
   a setting unit constructed to set a device driver to not be automatically deleted in accordance with a notification for deleting a device driver, wherein the device driver is set to not be automatically deleted when the device driver is selected and added to a prohibition list, and wherein the device driver is not set to not be automatically deleted when the device driver has been deleted from the prohibition list;
   a receiving unit constructed to receive the notification for deleting the device driver via the network from the external information processing apparatus;
   a determining unit constructed to determine, in response to the receiving unit receiving the notification, whether or not the device driver indicated in the notification is set as the device driver to not be automatically deleted; and
   a deleting unit constructed to delete, if the determining unit determines that the device driver indicated in the notification is not set as the device driver to not be automatically deleted, the device driver in response to the receiving unit receiving the notification,
   wherein, if the determining unit determines that the device driver indicated in the notification is set as the device driver to not be automatically deleted, the device driver is not deleted in response to the receiving unit receiving the notification.

2. The information processing apparatus according to claim 1, further comprising a displaying unit constructed to display a message dialog before the deleting unit deletes the device driver.

3. An information processing apparatus which communicates with an external information processing apparatus storing a device driver for controlling an image forming apparatus, the information processing apparatus comprising:
   at least a processor, functioning as:
   a management unit constructed to manage information of a device driver installed in the external information processing apparatus;
   a designation unit constructed to designate a device driver which is to be deleted based on the information of the device driver managed by the management unit; and
   a determining unit constructed to determine whether the designated device driver is set to be shared by the external information processing apparatus; and
   a transferring unit constructed to transfer a delete notification about the device driver designated by the designation unit to the external information processing apparatus when the determining unit determines that the device driver is not set to be shared by the external information processing apparatus,
   wherein the device driver is deleted from the external information processing apparatus in accordance with the delete notification, and
   wherein the delete notification is not transferred to the external information processing apparatus when the determining unit determines that the device driver is set to be shared by the external information processing apparatus
   wherein the device driver is prohibited from being deleted when the device driver is selected and added to a prohibition list, and wherein the device driver is not prohibited from being deleted when the device driver has been deleted from the prohibition list.

4. An information processing method for an information processing apparatus which communicates with an image forming apparatus and an external information processing apparatus via a network and stores a device driver for controlling the image forming apparatus, the information processing method comprising:
   a setting step of setting a device driver to not be automatically deleted in accordance with a notification for deleting a device driver, wherein the device driver is set to not be automatically deleted when the device driver is selected and added to a prohibition list, and wherein the device driver is not set to not be automatically deleted when the device driver has been deleted from the prohibition list;
   a receiving step of receiving the notification for deleting the device driver via the network from the external information processing apparatus;
   a determining step of determining, in response to receiving the notification, whether or not the device driver indicated in the notification is set as the device driver to not be automatically deleted; and a deleting step of deleting, if it is determined that the device driver indicated in the notification is not set as the device driver to not be automatically deleted, the device driver in response to the notification being received in the receiving step, wherein, if it is determined that the device driver indicated in the notification is set as the device driver to not be automatically deleted, the device driver is not deleted in response to the notification being received in the receiving step.

5. The information processing method according to claim 4, further comprising a displaying step of displaying a message dialog before the device driver is deleted in the deleting step.

6. An information processing method for an information processing apparatus which communicates with an external information processing apparatus storing a device driver for controlling an image forming apparatus, the information processing method comprising:

a management step of managing information of a device driver installed in the external information processing apparatus;

a designation step of designating a device driver which is to be deleted based on the information of the device driver managed in the management step; and a determining step of determining whether the designated device driver is set to be shared by the external information processing apparatus; and a transferring step of transferring a delete notification about the device driver designated in the designation step to the external information processing apparatus when it is determined in the determining step that the device driver is not set to be shared by the external information processing apparatus, wherein the device driver is deleted from the external information processing apparatus in accordance with the delete notification, and wherein the delete notification is not transferred to the external information processing apparatus when it is determined in the determining step that the device driver is set to be shared by the external processing apparatus wherein the device driver is prohibited from being deleted when the device driver is selected and added to a prohibition list, and wherein the device driver is not prohibited from being deleted when the device driver has been deleted from the prohibition list.

7. A non-transitory computer-readable storage medium on which is stored a control program, executed by an information processing apparatus which communicates with an image forming apparatus and an external information apparatus via a network and stores a device driver for controlling the image forming apparatus, comprising:

code for a setting step of setting a device driver to not be automatically deleted in accordance with a notification for deleting a device driver, wherein the device driver is set to not be automatically deleted when the device driver is selected and added to a prohibition list, and wherein the device driver is not set to not be automatically deleted when the device driver has been deleted from the prohibition list;

code for a receiving step of receiving the notification for deleting the device driver via the network from the external information processing apparatus;

code for a determining step of determining, in response to receiving the notification, whether or not the device driver indicated in the notification is set as the device driver to not be automatically deleted; and code for a deleting step of deleting, if it is determined that the device driver indicated in the notification is not set as the device driver to not be automatically deleted, the device driver in response to the notification being received in the receiving step, wherein, if it is determined that the device driver indicated in the notification is set as the device driver to not be automatically deleted, the device driver is not deleted in response to the notification being received in the receiving step.

8. A non-transitory computer-readable storage medium on which is stored a control program, executed by an information processing apparatus which communicates with an external information apparatus storing a device driver for controlling an image forming apparatus, comprising:

code for a management step of managing information of a device driver installed in the external information processing apparatus;

code for a designation step of designating a device driver which is to be deleted based on the information of the device driver managed in the management step; and code for a determining step of determining whether the designated device driver is set to be shared by the external information processing apparatus; and code for a transferring step of transferring a delete notification about the device driver designated in the designation step to the external information processing apparatus when it is determined in the determining step that the device driver is not set to be shared by the external information processing apparatus, wherein the device driver is deleted from the external information processing apparatus in accordance with the delete notification, and wherein the delete notification is not transferred to the external information processing apparatus when it is determined in the determining step that the device driver is set to be shared by the external processing apparatus wherein the device driver is prohibited from being deleted when the device driver is selected and added to a prohibition list, and wherein the device driver is not prohibited from being deleted when the device driver has been deleted from the prohibition list.

* * * * *